(12) United States Patent
Cornes et al.

(10) Patent No.: US 10,621,024 B2
(45) Date of Patent: Apr. 14, 2020

(54) SIGNAL PAIRING FOR MODULE EXPANSION OF A FAILSAFE COMPUTING SYSTEM

(71) Applicant: Artesyn Embedded Computing, Inc., Tempe, AZ (US)

(72) Inventors: Martin Peter John Cornes, Phoenix, AZ (US); Shlomo Pri-Tal, Phoenix, AZ (US)

(73) Assignee: SMART Embedded Computing, Inc., Tempe, AZ (US)

( * ) Notice: Subject to any disclaimer, the term of this patent is extended or adjusted under 35 U.S.C. 154(b) by 89 days.

(21) Appl. No.: 15/700,561

(22) Filed: Sep. 11, 2017

(65) Prior Publication Data

US 2019/0079823 A1 Mar. 14, 2019

(51) Int. Cl.
*G06F 11/07* (2006.01)
*G06F 13/40* (2006.01)

(52) U.S. Cl.
CPC ...... *G06F 11/0745* (2013.01); *G06F 11/0796* (2013.01); *G06F 13/4068* (2013.01)

(58) Field of Classification Search
CPC ............ G06F 11/0745; G06F 11/0796; G06F 13/4068
USPC ........................................................... 714/2
See application file for complete search history.

(56) References Cited

U.S. PATENT DOCUMENTS

| | | | | |
|---|---|---|---|---|
| 6,434,512 B1* | 8/2002 | Discenzo | ............... | F16C 19/52 702/184 |
| 6,931,568 B2* | 8/2005 | Abbondanzio | ..... | G06F 11/2028 714/11 |
| 7,047,440 B1* | 5/2006 | Freydel | ............. | G05B 19/0428 714/10 |
| 2005/0021606 A1* | 1/2005 | Davies | ............... | G06F 11/1456 709/203 |
| 2006/0190702 A1* | 8/2006 | Harter | ..................... | G06F 11/10 712/15 |
| 2006/0259809 A1* | 11/2006 | Mishra | .................. | G06F 21/552 714/4.4 |
| 2008/0126852 A1* | 5/2008 | Brandyberry | ....... | G06F 11/0745 714/6.13 |
| 2010/0049268 A1* | 2/2010 | Martins | ............... | G06F 11/2025 607/9 |
| 2011/0283134 A1* | 11/2011 | Ma | ...................... | H04L 43/0817 714/4.2 |
| 2013/0227648 A1* | 8/2013 | Ricci | .................... | G06F 3/0484 726/3 |
| 2014/0086261 A1* | 3/2014 | Rao | .................... | G06F 13/4068 370/419 |

(Continued)

Primary Examiner — Matthew M Kim
Assistant Examiner — Indranil Chowdhury
(74) *Attorney, Agent, or Firm* — Harness, Dickey & Pierce, P.L.C.

(57) ABSTRACT

A system includes a central processing unit (CPU), a first input/output (I/O) module, and a second I/O module. The first I/O module includes a first module health controller operatively connected to the CPU. The second I/O module includes a second module health controller operatively connected to the first module health controller and the CPU. One of the first module health controller and the second module health controller is configured to assert a paired module health signal to the CPU indicating that the first I/O module and the second I/O module are health.

18 Claims, 13 Drawing Sheets

(56) References Cited

U.S. PATENT DOCUMENTS

| | | | | |
|---|---|---|---|---|
| 2015/0168993 A1* | 6/2015 | Tufford | ................... | G06F 1/189 |
| | | | | 361/679.6 |
| 2015/0169424 A1* | 6/2015 | Vaananen | ........... | G06F 11/3055 |
| | | | | 714/36 |
| 2015/0171893 A1* | 6/2015 | Vaananen | ............... | G06F 11/10 |
| | | | | 714/819 |
| 2015/0193341 A1* | 7/2015 | Ye | ........................... | G06F 9/522 |
| | | | | 711/202 |
| 2015/0293806 A1* | 10/2015 | Cornes | ................. | B60T 13/665 |
| | | | | 714/47.1 |

\* cited by examiner

| | PAIR* | GALSb* | mR | PMPO* | PMPr* | MHPO* | MHPr* | MH |
|---|---|---|---|---|---|---|---|---|
| 1102 | x | x | False =not ready | | x | 1 | x | 0 |
| 1104 | 1=not pairing | x | True=ready | x | x | x | x | Assert |
| 1106 | 0=pairing | x | x | 0=I'm present | x | x | x | x |
| 1108 | 0=pairing | x | True=ready | 0=I'm present | 0=pair is present | 0 | 1 | 0 |
| 1110 | 0=pairing | x | True=ready | 0=I'm present | 1=pair is not present | 0 | x | Assert |
| 1112 | 0=pairing | 1=even | True=ready | 0=I'm present | 0=odd is present | 0 | 0 | Assert |

FIG. 11

SIGNAL PAIRING FOR MODULE EXPANSION OF A FAILSAFE COMPUTING SYSTEM

FIELD

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An external safety system, such as a railway system, may include fault-tolerant failsafe computer systems configured to implement a safety application. The fault-tolerant failsafe computer systems may include a plurality of hardware components electrically and logically coupled in order to implement the safety application. The safety application selectively communicates with safety critical hardware and software. The safety critical hardware and software are configured to control safety relevant functions of the railway system.

For example, a train riding on the railway system includes a braking system. The braking system is configured to implement at least one safety relevant function, such as a braking function. The braking system includes a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

In addition, as external safety system networks continue to expand in scope and complexity, the amount of data being transmitted over such networks has increased in kind. Conventional fault-tolerant failsafe computer systems frequently lack the I/O capacity to handle the increasing data throughput. Furthermore, tracking the health of discrete components of a fault-tolerant failsafe computer system becomes more challenging as systems increase in complexity and size to meet the growing I/O demands. Accordingly, a fault-tolerant failsafe computer system configured to address one or more of the foregoing issues is desired.

SUMMARY

This section provides a general summary of the disclosure, and is not a comprehensive disclosure of its full scope or all of its features.

In a feature, a system is provided. The system may include a central processing unit (CPU), a first input/output (I/O) module, and a second I/O module. The first I/O module may include a first module health controller operatively connected to the CPU. The second I/O module may include a second module health controller operatively connected to the first module health controller and the CPU. The first module health controller and the second module health controller may be configured to assert a paired module health signal to the CPU indicating that the first I/O module and the second I/O module are healthy.

In another feature, the asserted paired module health signal may include a repeating, predefined bit pattern.

In yet another feature, the CPU may be configured to place the first I/O module and the second I/O module in one of the following states upon reception of the asserted paired module health signal: an active state or a standby state.

In one feature, one of the first module health controller and the second module health controller may be configured to de-assert the paired module health signal if at least one of the first I/O module and the second I/O module is unhealthy. In one example of the foregoing feature, the de-asserted paired module health signal may include a low signal. In another example of the foregoing feature, the CPU may be configured to place the first I/O module and the second I/O module in a failsafe state upon reception of the de-asserted paired module health signal.

In a feature, the system may also include a backplane operatively connected to the first module health controller, the second module health controller, and the CPU. The backplane may be configured to transmit signals between the first module health controller and the second module health controller. In one example of the foregoing feature, the signals may include at least one of the following: a peer module present output (PMPO) signal; a peer module present input (PMPI) signal; a module health pair output (MHPO) signal; and a module health pair input (MHPI) signal.

In one feature, each of the first module health controller and second module health controller may be configured to receive a PAIR signal indicating whether the first I/O module and second I/O module should assert their respective health statuses individually or in paired fashion.

In other features, a method includes receiving, by a first input/output (I/O) module, a PAIR signal indicating whether the first I/O module should assert a paired module health signal or an individual module health signal. The paired module health signal may indicate a module health of both the first I/O module and a second I/O module operatively connected to the first I/O module, whereas the individual module health signal may indicate a module health of only the first I/O module. The method may also include asserting, by the first I/O module, the paired module health signal in response to the PAIR signal indicating that the first I/O module should assert the paired module health signal. In addition, the method may include asserting, by the first I/O module, the individual module health signal in response to the PAIR signal indicating that the first I/O module should assert the individual module health signal.

In one feature, the method may include placing the first I/O module and the second I/O module in one of the following states: an active state or a standby state in response to the first I/O module asserting the paired module health signal.

In another feature, the method may include de-asserting, by the first I/O module, the paired module health signal in response to determining that at least one of the first I/O module and the second I/O module is unhealthy.

In one feature, the method may include placing the first I/O module and the second I/O module in a failsafe state in response to the first I/O module de-asserting the paired module health signal.

In another feature, the method may include transmitting signals between the first I/O module and the second I/O module. In one example of the foregoing feature, the signals may include at least one of the following: a peer module present output (PMPO) signal; a peer module present input (PMPI) signal; a module health pair output (MHPO) signal; and a module health pair input (MHPI) signal.

In a feature, the method may include placing the first I/O module in one of the following states in response to the first I/O module asserting the individual module health signal: an active state or a standby state. In one example of the foregoing feature, the asserted individual module health signal may include a repeating, predefined bit pattern.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11 is a table illustrating logic for an exemplary I/O module configured for signal pairing according to the principles of the present disclosure;

Corresponding reference numerals indicate corresponding parts throughout the several views of the drawings.

DETAILED DESCRIPTION

Example embodiments will now be described more fully with reference to the accompanying drawings.

Figure 1:
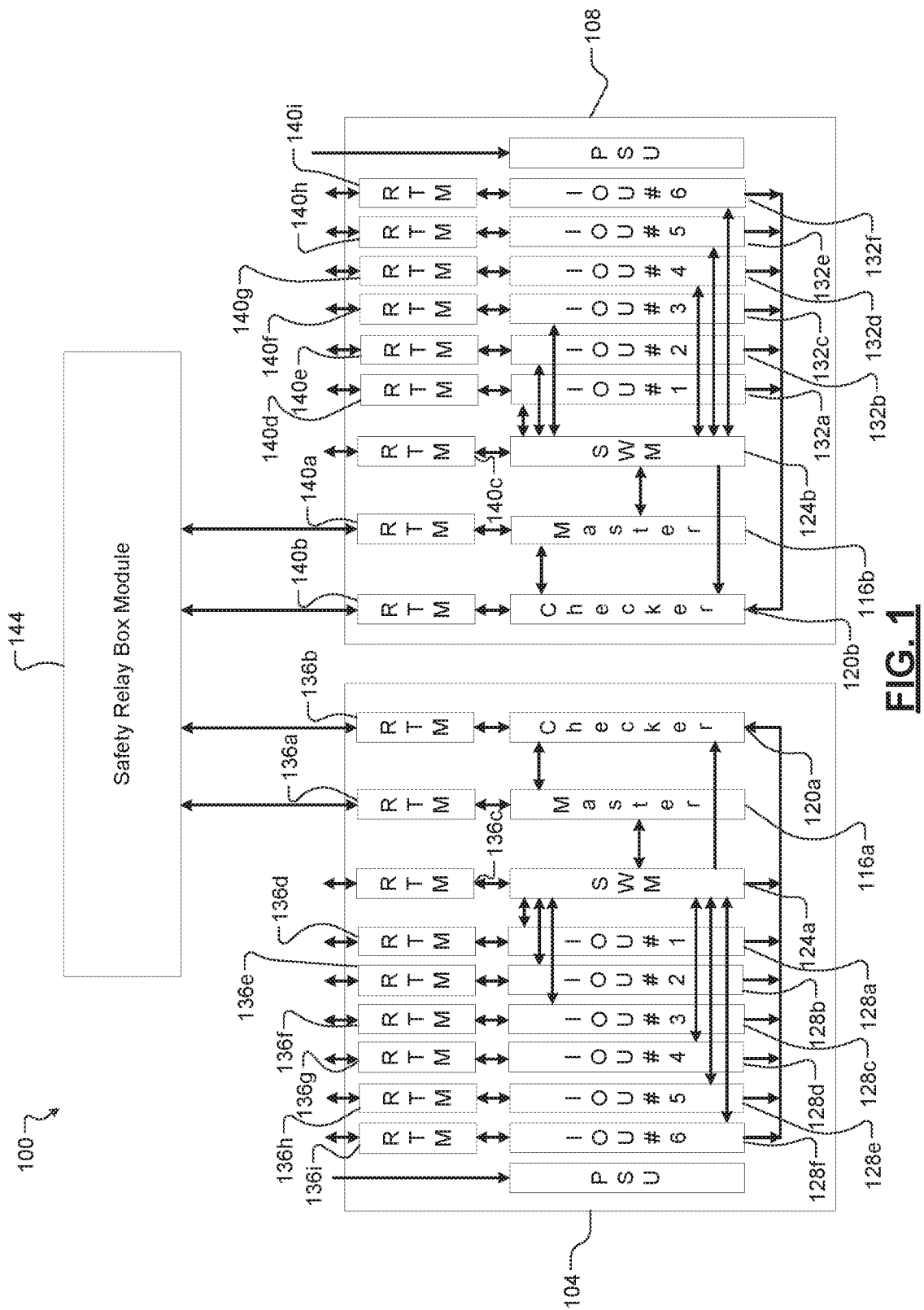
FIG. 1 is a functional block diagram of a fault-tolerant failsafe computer system according to the principles of the present disclosure.

Referring now to FIG. 1, a functional block diagram of an exemplary fault-tolerant failsafe computer system 100 is shown. The system 100 is arranged to interact with safety applications. For example, the system 100 is arranged to communicate with safety critical hardware and software associated, by way of non-limiting example, a railway system. The safety critical hardware and software control safety relevant components of the railway system. For example, the safety critical hardware may be coupled to a brake system of a train operating on the railway system. Further, the system 100 may be capable of being certified according to an industry recognized safety standard.

The safety critical hardware receives data elements from the safety critical software to actuate a brake of the brake system. The system 100 interfaces with the safety critical hardware and software to ensure the safety critical hardware and software are operating according to a predetermined operating standard. It is understood that while only a brake system of the train is described, the principles of the present disclosure apply to any safety critical hardware and software. Other possible applications for the embodiments described herein include, but are not limited to, components of an airline system, components of a medical treatment system, components of an oil and gas control system, components of a smart grid system, and components of various manufacturing systems.

In some implementations, the system 100 receives a plurality of incoming data packets from an external safety system, such as the railway system. The system 100 is configured to process the plurality of incoming data packets and communicate a plurality of outgoing data packets to safety relevant components of the external safety system. For example, the system 100 determines whether a first packet of the plurality of incoming data packets is a valid packet. When the system 100 determines the first packet is a valid packet, the system 100 communicates an outgoing packet to at least one safety relevant component of the railway system.

The first packet includes data elements to be acted on by the at least one safety relevant component of the railway system. The data elements may include sensor data and/or input/output (I/O) point states. The at least one safety relevant component may be a brake coupled to a train riding on the railway system. It is understood that while only safety relevant components of the external safety system are described, the first packet may include data elements to be acted on by non-safety relevant components of the external safety system. The data elements are formatted according to a transfer protocol. For example, the railway system is configured to package the data elements according to a predetermined packaging standard into transferable packets. The railway system then transfers the plurality of incoming data packets according to the transfer protocol.

The system 100 is arranged to receive packets transmitted according to the transfer protocol. Further, the system 100 is configured to interpret the predetermined packaging standard. The system 100 then extracts the data elements from the first packet and generates an outgoing data packet based on the data elements. The outgoing data packet includes a set of instructions based on the data elements. While only instructions are discussed, the outgoing data packet may also include operating instruction to control I/Os, a request to read an input in order to gather information, health message communications, a request for inter-process communication, or other suitable elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies a brake.

The system 100 determines whether to communicate the outgoing data packet and data elements to the safety critical hardware and software. For example, the system 100 ensures each of the plurality of incoming data packets meet a predetermined safety standard. The predetermined safety standard includes determining whether or not the railway system is operating according to a predefined set of operating standards. The system 100 verifies that each of the plurality of incoming data packets was intentionally transferred by the railway system 100. For example only, the railway system may transfer erroneous incoming data packets due to a hardware or software fault within the railway system.

The safety critical hardware and software receives the first packet of the plurality of incoming data packets in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture. The safety critical hardware and software communicate the plurality of incoming data packets, including the first and second packet, to the system 100. The system 100 is configured to determine whether each of the plurality of incoming data packets was received by the safety critical hardware and software as a result of a fault in the railway system.

When the system 100 determines one of the plurality of incoming data packets was received in response to a command from the operator, the system 100 generates an outgoing data packet corresponding to the received incoming data packet. For example, the system 100 generates a first outgoing data packet based on the first packet. The first outgoing data packet includes a set of instructions corresponding to the data elements within the first packet. When the system 100 determines the first packet is a valid packet, the system 100 communicates the first outgoing data packet to the safety critical hardware and software. For example, the system 100 determines the first packet was received in response to a command from the operator. The system 100 communicates the first outgoing data packet to the safety critical hardware and software. The safety critical hardware and software execute the set of instructions included in the first outgoing data packet.

Conversely, when the system 100 determines one of the plurality of incoming data packets was received in response to a fault within the railway system, the system 100 does not communicate an outgoing data packet to the safety critical hardware and software. For example, the system 100 determines the second packet was received due to a fault in the railway system. The system 100 does not communicate an outgoing data packet corresponding to the second packet to the safety critical hardware and software. Consequently, the safety critical hardware and software do not execute instructions corresponding to data elements included in the second packet.

Further, the system 100 generates a fault indication based on the determination that a fault occurred within the railway system. In this way, data elements executed by the safety critical hardware and software are first verified by the system 100. This verification ensures the railway system is operating according to the predetermined safety standard.

In some implementations, the system 100 receives a first packet of the plurality of incoming data packets. Simultaneously, the system 100 receives a second packet of the plurality of incoming data packets. The system 100 then executes voting logic on the first and second packet. The voting logic may be implemented as a dual two-of-two (2oo2) system. The 2oo2 voting logic is explained in greater detail below. The system 100 determines whether the first and second packets are identical. When the system 100 determines the first and second packets are identical, the system 100 generates a first outgoing data packet and communicates the first outgoing data packet to at least one component of the safety critical hardware and software.

The at least one component then executes operating data elements included within the first outgoing data packet. Conversely, when the first and second packets are not identical, the system 100 identifies at least one component of the system 100 or the railway system as faulty. It is understood that while a railway system is described, the principles of the present disclosure apply to any external safety systems.

The system 100 also generates a safety indication. The safety indication may be indicative of a failure within the system 100 or the safety critical hardware and software. Further, the system 100 instructs the at least one component to operate in a predetermined safe state. For example, the safe state may include a set of safe state data elements arranged to maintain a safe operating environment of the railway system.

The safe state data elements include instructing the railway system to operate in a predetermined operating mode that ensures the overall safety of the railway system. For example only, the predetermined operating mode includes bringing a train operating on the railway system to a stop. In some implementations, the safe state includes disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is configured to execute any and all operations of the standby FSC 108. In this way, when one of the active FSC 104 and the standby FSC 108 encounters a hardware or software failure, the other of the active FSC 104 and the standby FSC 108 is configured to operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. The active FSC 104 receives two copies of a first packet of the plurality of incoming data packets.

The active FSC 104 determines the validity of the first packet. The active FSC 104 continuously generates a first health status signal and a second health status signal based on the determination of whether the first packet is valid. In some implementations, continuously generating a signal may include setting the signal to a first predetermined value. The continuously generated signal is then maintained at the first predetermined value until the signal is de-asserted to a second predetermined value.

The active FSC 104 compares each of the two copies of the first packet. When the two copies are identical, the active FSC 104 determines the first packet is valid. The active FSC 104 continuously generates the first health status signal and the second health status signal when the active FSC 104 determines the first packet is valid. The first and second health status signals may be asserted to a first value. In some implementations, the first value is equal to 1. In another implementation, the first value may be a string of characters that indicate the FSC 104 is healthy.

Conversely, when the active FSC 104 determines the two copies of the first packet are not identical, the active FSC 104 de-asserts the first and second health status signals. It is understood that the first and second health status signals may be de-asserted to a second value. For example, the second value may be equal to 0. In another implementation, the second value may be a string of characters that indicate the FSC 104 is not healthy. As will be described in greater detail below, the active FSC 104 includes a first processor and a second processor. The first processor continuously generates the first health status signal when the first processor determines the copy of the first packet is valid. Similarly, the second processor continuously generates the second health status signal when the second processor determines the second copy of the first packet is valid.

The active FSC 104 communicates the first and second health status signals to the system 100. The system 100 monitors the first and second health status signal to determine whether the active FSC 104 is healthy. For example, when the system 100 receives the first and second health status signals, the system 100 determines the active FSC 104 is healthy. Conversely, when the system 100 does not receive one of the first health status signal and the second health status signal, the system 100 determines the active FSC 104 is not healthy.

As will be discussed in detail below, the system 100 instructs the active FSC 104 to operate in a safe state in order to maintain the safety of the system 100. It is understood that while only voting mismatches are discussed in relation to the first and second status signals being de-asserted, any hardware or software failure within the system 100 may cause one of the first and second status signals to be de-asserted. The health status signal may indicate the system 100 is operating according to a predetermined operating standard. In this way, the health status signal indicates the system 100 is healthy.

When the active FSC 104 determines that the two copies of the first packet are not identical, the active FSC 104 determines a voting fault has occurred. The active FSC 104 generates a fault signal based on the determination that a voting fault has occurred. The fault signal is indicative of a detected fault within the system 100. The fault may be due to hardware or software failure within the system 100 or the external safety system. For availability reasons, if the active FSC 104 encounters a hardware or software failure, the system 100 forces the active FSC 104 to a predetermined safe state. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in an overall system architecture. For example, the higher-level equipment may be components of a railway braking system of the railway system.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100. For example only, the user interface may implemented as a plurality of light emitting diodes (LEDs).

The communication links communicate with hardware components and software applications external to the system 100. Further, the system 100 is configured to receive input and communicate output to a field engineer. For example, the field engineer may selectively configure the system 100 by communicating with the a user interface of the system 100.

Each of the active FSC 104 and the standby FSC 108 are arranged to execute a health and safety application. For example, the active FSC 104 and the standby FSC 108 include a memory and a processor. The health and safety application may be software loaded into the memory of the active FSC 104 and the standby FSC 108. The health and safety application is then executed by the processor of the active FSC 104 and the standby FSC 108.

The health and safety application monitors and controls the active FSC 104 and the standby FSC 108. For example, the health and safety application generates a plurality of health signals. The plurality of health signals may include, but is not limited to, a module health signal and a mask signal. The health and safety application generates the plurality of signals based on a fault in active FSC 104, for example. The health and safety application is a functional safety subsystem designed to detect and respond to failures by forcing one of the active FSC 104 or the standby FSC 108 to the safe state.

It is understood that the health and safety application may include any safety applications executed on an external safety system. This may include ensuring the validity and safety of a set of data elements prior to the set of data elements being executed by the hardware and software of the railway system. The health and safety application is also configured to ensure the railway system operates in the predetermined safe state when the health and safety application detects a failure in the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120a, and the checker CPU 120b act to increase the availability and reliability of the system 100.

In order to monitor and control the overall health and safety of the system 100, the master CPU 116a and the checker CPU 120a are also configured to be identical. For example, the master CPUs 116*a* and the checker CPU 120*a* execute identical software and implement identical processing functions. The master CPU 116*a* and the checker CPU 120*a* are configured to perform identical functions in order to maintain full hardware fault and error detection coverage of the safety critical hardware and software and allow for voting on outgoing packets in the correct sequence.

In some implementations, the master CPU 116*a* receives a request to perform a task from at least one of the safety critical hardware or software of the railway system. The request to perform a task is based on a command received by the safety critical hardware and software from the operator of the external safety system. For example, the operator of the railway system may command a train riding on the railway system to increase speed. The operator may actuate a physical lever within the train. The physical lever is arranged to generate a signal indicative of the command to increase the speed of the train. The signal is communicated to the safety critical hardware and software.

Prior to executing the command, the safety critical hardware and software communicate the safety relevant task to the system 100. The system 100 is configured to interpret the signal and determine a requested task associated with the signal. The system 100 then determines whether the requested task is indicative of a safety relevant task. For example, the requested task may be a safety relevant task or a non-safety relevant task. In one example, a non-safety relevant task includes instructions that instruct the safety critical hardware and software to return a current status of the train operating within the railway system. In another example, a safety-relevant task includes instructions that instruct the safety critical hardware and software to increase the speed of the train.

The system 100 compares the requested task to a list of predefined tasks. The system 100 determines, based on the predefined tasks, whether the requested task is safety relevant. When system 100 determines the requested task is a safety relevant task, the system 100 generates a packet corresponding to the requested task. It is understood that while only a safety relevant task is described herein, the system 100 may generate a packet from any task. The system 100 communicates the packet to the master CPU 116*a*. Both the master CPU 116*a* and the checker CPU 120*a* are configured to verify the validity of the packet before the safety critical hardware and software execute the requested task. For example, the request to perform a task may be one of the plurality of incoming data packets.

Simultaneously, the checker CPU 120*a* receives a copy of the same packet corresponding to the requested task. Each of the master CPU 116*a* and the checker CPU 120*a* is configured to communicate a copy of the packet to the other of the master CPU 116*a* and the checker CPU 120*a*. Prior to the master CPU 116*a* instructing the safety critical hardware and software to perform the requested task, the master CPU 116*a* and the checker CPU 120*a* compare the packet received by each of the master CPU 116*a* and the checker CPU 120*a*. For example, the master CPU 116*a* and the checker CPU 120*a* perform 2oo2 voting on the packet.

When the packets are identical, the master CPU 116*a* instructs the safety critical hardware and software to perform the requested task. For example, the master CPU 116*a* and the checker CPU 120*a* generates an outgoing packet associated with the requested task. When voting is successful (i.e., the packets are identical) the master CPU 116*a* communicates the outgoing packet to the safety critical hardware and software to execute the requested task.

The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train.

Conversely, when the packets are not identical, the master CPU 116*a* and the checker CPU 120*a* do not instruct the safety critical hardware and software to perform the requested task. The master CPU 116*a* generates a fault signal. The fault signal is indicative of a failure within the system 100, the safety critical hardware and software, or the external safety system. In this way, the master CPU 116*a* verifies that the requested task is a valid request from a valid source (i.e., an external hardware component or software application.)

For example only, the master CPU 116*a* receives erroneous requests to perform tasks due to external hardware failure, a software error, or an overall system malfunction. It is understood that while only the master CPU 116*a* and the checker CPU 120*a* are described, the principles described above also apply to the master CPU 116*b* and the checker CPU 120*b*.

Each of the active FSC 104 and the standby FSC 108 include a plurality of input/output unit (IOU) modules. The active FSC 104 includes IOU modules 128*a*-128*f*. The IOU modules 128*a*-128*f* will hereinafter be referred to as the IOU module 128. Similarly, the standby FSC 108 includes IOU modules 132*a*-132*f*, which are identical to the IOU modules 128*a*-128*f*. The IOU modules 132*a*-132*f* will hereinafter be referred to as the IOU module 132.

The active FSC 104 and the standby FSC 108 also each include a voting subsystem, an input/output (I/O) subsystem, and a switch module 124*a* and a switch module 124*b* respectively. The switch module 124*a* and the switch module 124*b* are configured to be identical. The switch module 124*a* and the switch module 124*b* route packets received from the I/O subsystem to the master CPUs 116*a* and 116*b* and the checker CPUs 120*a* and 120*b*.

For example, the switch module 124*a* may route a packet received from the master CPU 116*a* to an external network component. Further, the switch module 124*a* receives packets from an external component and routes the received packets to the master CPU 116*a*, the checker CPU 120*b*, and the I/O subsystem. Further, the switch module 124*a* communicates the received packets to the voting subsystem. It should be appreciated that while only the switch module 124*a* is described, the principles described above also apply to the switch module 124*b*.

The IOU module 128 implements the I/O subsystem within the active FSC 104. The I/O system is configured to provide a gateway between lower-level network equipment and the master CPU 116*a* and the checker CPU 120*a*. The IOU module 128 isolates the master CPU 116*a* and the checker CPU 120*a* from low level protocols required by external hardware and software. In this way, the IOU module 128 adds a safety layer on the internal Ethernet to support safe communication between the master CPU 116*a*, checker CPU 120*a*, and the external hardware and software. The IOU module 128 and the switch module 124*a* may be referred to collectively as the front blades 124a-128f. Similarly, the IOU module 132 and the switch module 124b may be referred to collectively as the front blades 124b-132f.

The active FSC 104 and the standby FSC 108 also include a plurality of rear transition modules (RTMs). The active FSC 104 includes RTMs 136a-136i. The standby FSC 108 includes RTMs 140a-140i. It should be appreciated that because the standby FSC 108 is a redundant configuration of the active FSC 104, the RTMs 136a-136i are identical to the RTMs 140a-140i. In some implementations, each of the RTMs 136a-136i may be hot swappable field replaceable units (FRUs).

For example, each of the RTMs 136a-136i may be removed and replaced by a field engineer without first having to power off the entire system 100. The RTMs 136a-136i allows the active FSC 104 to communicate with the external hardware and software components. For example, the RTM 136a electrically and logically couples the master CPU 116a to components external to the active FSC 104. Similarly, the RTM 136b electrically and logically couples the standby FSC 108 to external hardware and software components.

The front blades 124a-128f each includes a first memory location and a second memory location. The first and second memory locations store a value received from a corresponding hardware component of the active FSC 104. For example, the master CPU 116a continuously generates a module health signal (described above) indicative of the module health of the master CPU 116a. The master CPU 116a stores a 1 in the first memory location when the module health signal indicates the master CPU 116a is healthy.

Each of the front blades 124a-128f and the master CPU 116a generates a module health signal. Each of the front blades 124a-128f stores a value indicative of the module health signal in a first memory location. For example only, the switch module 124a stores a 1 in a first memory location associated with switch module 124a when the module health signal indicates the switch module 124a is healthy.

Conversely, the switch module 124a stores a 0 in the first memory location when the module health signal indicates the switch module 124a is not healthy. It is understood that while only the switch module 124a is described, the principles discussed herein apply to all modules within the system 100. It is further understood that while only storing a 1 and 0 based on the module health signal are described, any suitable indicator may be used to indicate the health of each of the modules within the system 100. Each of the modules within the system 100 then communicates the value stored in the associated first memory location to the master CPU 116a.

The master CPU 116a determines whether the active FSC 104 is healthy based on receipt of a plurality of values corresponding to the module health signals generated by each of the front blades 124a-128f and a module health signal generated by the master CPU 116a. For example only, the master CPU 116a determines that the active FSC 104 is healthy when each of the received values corresponding to the module health signals indicates that each of the modules within the system 100 is healthy. Conversely, the master CPU 116a determines that the active FSC 104 is not healthy when at least one of the received values corresponding to the module health signals indicates that at least one of the modules within the system 100 is not healthy.

In another implementation, a value indicative of the module health signal is stored in a module configured at the front of the system 100. For example, a module configured on the opposite side of the system 100 from the RTM 136s stores a 1 in the first memory location when the module health signal indications the master CPU 116a is healthy. It is understood that while only the master CPU 116a is described, the principles described herein apply to the checker CPU 120a.

The master CPU 116a receives a first packet of the plurality of incoming data packets. Simultaneously, the checker CPU 120a receives a copy of the first packet. The master CPU 116a and the checker CPU 120a determine whether the first packet and the copy of the first packet are identical. When the first packet and the copy of the first packet are identical, the master CPU 116a continuously generates a module health signal. The module health signal may be set to 1 or a high signal value. The value of the module health signal is indicative of the health of the active FSC 104. The master CPU 116a stores a 1 in the first memory location.

Conversely, when the first packet and the copy of the first packet are not identical, the master CPU 116a generates an invalid module health signal. For example, the master CPU 116a de-asserts the module health signal. The master CPU 116a stores a 0 in the first memory location. The master CPU 116a receives a mask signal indicative of the state of the mask register within the master CPU 116a. For example, the mask register is a programmable bit within each of the master CPU 116a and the checker CPU 120a.

The mask register is set when a requested task is a safety-relevant task. For example, the mask register is set to 1 when the system 100 determines the requested task is a safety-relevant task. The RTM 136a stores a 1 in the second memory location when the mask signal indicates the mask register within the master CPU 116a is set to a 1. Conversely, the RTM 136a stores a 0 in the second memory location when the mask signal indicates the mask register within the master CPU 116a is set to a 0.

The system 100 also includes a watchdog timer application. The watchdog timer application is a continuously running watchdog function that indicates whether the master CPU 116a is has stopped executing code. For example, the watch dog timer application monitors the master CPU 116a. The master CPU 116a generates a watchdog timer reset signal. The master CPU 116a communicates the watchdog timer reset signal to the watchdog timer application. The watchdog timer application determines whether the watchdog timer reset signal was received within a predefined period. For example, the predefined period may be 1 minute. The predefined period may be a configurable item.

The watchdog timer application generates a watchdog health signal based on the watchdog timer reset signal. For example, when the master CPU 116a communicates a watchdog timer reset signal after the predefined period, the watchdog timer application sets the watchdog health signal to 0. Conversely, when the master CPU 116a communicates the watchdog timer reset signal within the predefined period, the watchdog timer application sets the watchdog health signal to 1. In other words, the watchdog timer application determines a fault in the master CPU 116a when the master CPU 116a is incapable of communicating with the watchdog application within the predefined period. For example, the fault may be as a result of the master CPU 116a being stuck in a software loop. It is understood that while the only master CPU 116a is described above, the checker CPU 120a is configured to identical tasks as the master CPU 116a.

The RTM 136a communicates a module health value indicative of the overall health of the master CPU 116a. For example, the RTM 136a is configured to perform a logical OR on the value stored in the first memory location and the value stored in the second memory location. For example, when the value stored in the first memory location is 0 and when the value stored in the second memory location is 0 the RTM 136*a* will a communicate a module health value of 0.

When the value stored in the first memory location is 1 and the value stored in the second memory location is a 0, the RTM 136*a* communicates a module health value of 1. It is understood that each of the RTMs 136*a*-136*i* is configured to perform a logical OR on values stored within memory of associated with each of the front blades 124*a*-128*f*.

The RTMs 136*a* and 136*b* communicate a chassis health value to the safety relay box module 144. The safety relay box module 144 selectively determines which of FSCs within the system 100 will be the active FSC and which will be the standby FSC based on a plurality of chassis health values. For example, the safety relay box module 144 receives a plurality of chassis health values from the RTM 136*a*, RTM 136*b*, RTM 140*a*, and RTM 140*b*. The RTM 136*a* generates a first chassis health value based on the cumulative result of the module health signals generated by the master CPU 116*a* and the front blades 124*a*-128*f* and a value stored in the mask registers.

The RTM 136*a* communicates the chassis health value to the safety relay box module 144. Similarly, the RTM 136*b* generates a second chassis health value based the cumulative result of the module health signals generated by the checker CPU 120*a* and the front blades 124*a*-128*f* and a value stored in the mask registers. The RTM 140*a* generates a third chassis health value based on the cumulative result of the module health signals generated by the master CPU 116*b* and the front blades 124*b*-132*f* and a value stored in the mask registers. Similarly, the RTM 140*b* generates a fourth chassis health value based on the cumulative result of the module health signals generated by the checker CPU 120*b* and the front blades 124*b*-132*f* and a value stored in the mask registers.

The safety relay box module 144 determines which of the active FSC 104 and the standby FSC 108 will operate as an active FSC within the system 100. For example, the safety relay box module 144 determines the active FSC 104 will operate as the active FSC within the system 100 based the first-fourth chassis health values. The safety relay box module 144 determines the active FSC 104 will be the active FSC within the system 100 when the first and second chassis health signals indicate the active FSC 104 is healthy.

The safety relay box module 144 generates an active FSC signal and a standby FSC signal based on the active FSC determination. For example, the safety relay box module 144 generates a first active FSC signal and a second active FSC signal. The first and second active FSC signals are redundant signals that are both indicative of which FSC is elected to operate as the active FSC. The safety relay box module 144 also generates a first standby FSC signal and a second standby FSC signal.

The first and second standby FSC signals are redundant signals that are both indicative of which FSC was elected to operate as the standby FSC. The safety relay box module 144 communicates the first active FSC signal and the first standby FSC signal to the active FSC 104. Similarly, the safety relay box module communicates the second active FSC signal and the second standby FSC signal to the standby FSC 108.

The safety relay box module 144 also determines whether a fault has occurred in one of the active FSC 104 and the standby FSC 108 based on first-fourth chassis health signals. For example, the safety relay box module 144 determines a fault has occurred in the active FSC 104 when the safety relay box module 144 receives an invalid chassis health signal from one of the RTMs 136*a* and 136*b*. For example, an invalid chassis health signal may be a chassis health value of 0. The safety relay box module 144 generates a standby signal based on the invalid chassis health signal. The safety relay box module 144 communicates the standby signal to the active FSC 104. The active FSC 104 determines whether to enter the failsafe state based on the standby signal. For example, the active FSC 104 determines to enter the failsafe state when the active FSC 104 receives the standby signal.

The safety relay box module 144 generates an active signal based on the chassis health value. The safety relay box module 144 communicates the active signal to the standby FSC 108. The active signal indicates to the standby FSC 108 that the active FSC 104 is operating in the failsafe state or standby state. When the standby FSC 108 receives the active signal, the standby FSC 108 begins operating as the active FSC. In this way, the safety relay box module 144 forces a failed active FSC into a failsafe state, and alerts a standby FSC to assume the role of active FSC.

In some implementations, the safety relay box module 144 is configured to communicate with a plurality of commercial off the shelf (COTS) products. For example, the active FSC 104 and the standby FSC 108 may be COTS products implemented within the system 100. The active FSC 104 and the standby FSC 108 are configured according to a predetermined implementation standard. The implementation standard includes a predefined communication protocol.

The safety relay box module 144 is configured to receive and interpret signals and messages from the active FSC 104 and the standby FSC 108 according to the communication protocol. In this way, the safety relay box module 144 communicates with the active FSC 104 and the standby FSC 108 regardless of the physical characteristics of the active FSC 104 and the standby FSC 108 so long as the active FSC 104 and the standby FSC 108 follow the communication protocol. It is understood that the safety relay box module 144 communicates with any component within the system 100. Further, any component within the system 100 may be implemented utilizing COTS products so long as the any component follows the communication protocol.

In some implementations, the I/O subsystem also receives packets from external sources such as hardware and software components of the rail system. The received packets may include the plurality of incoming data packets as discussed above. The I/O subsystem then communicates the received packets to the voting subsystem.

The voting subsystem is a functional safety subsystem and is configured to detect and respond to failures. When the voting subsystem detects an error in one of the active FSC 104 and the standby FSC 108, the voting subsystem forces the one of the active FSC 104 and the standby FSC 108 to the failsafe state. The voting subsystem performs fault detection of the processing subsystem. For example, the master CPU 116*a* and the checker CPU 120*a* generate outgoing packets based on a requested task.

The voting subsystem compares the outgoing packets generated by the mater CPU 116*a* to the outgoing packets generated by the checker CPU 120*a*. When the outgoing packets are identical, the voting subsystem communicates a single copy of a packet to the switch module 124*a* and to the I/O subsystem. When the outgoing packets are not identical, the voting subsystem forces the active FSC 104 to the failsafe state. In this way, the voting subsystem detects faults in one of the active FSC 104 and the standby FSC 108. Upon detecting a fault in the one of the active FSC 104 and the standby FSC 108, the voting subsystem brings the system 100 to a safe state by forcing the faulty FSC to the failsafe state.

The voting subsystem also receives packets from the I/O subsystem. For example, the IOU modules 128 communicate with the voting subsystem via the switch modules 124*a*. The IOU modules 128 communicate a first packet to switch module 124*a*. The switch module 124*a* duplicates the first packet. For example, the switch module 124*a* generates a second packet. The second packet is a copy of the first packet. The switch module 124*a* communicates the first packet to the master CPU 116*a* and the checker CPU 120*a*. The master CPU 116*a* and the checker CPU 120*a* executing voting logic on the first and second packets as described above. In this way, the voting subsystem verifies the validity of the received packets.

In another example, the first packet may not be identical to the second packet due to a hardware malfunction in an external component, such as the safety critical hardware of the rail system. When the voting subsystem determines the first packet is not identical to the second packet, the safety application forces the active FSC 104 to the failsafe state. Additionally or alternatively, the mismatched packets may be silently discarded. For example, neither the master CPU 116*a* nor the checker 120*a* generates an outgoing packet based on the first and second packet. In this way, the system 100 may avoid excessive failover/failsafe transitions due to otherwise recoverable errors. In another implementation, input voting may be configured to result in failover/failsafe transition.

Figure 2:
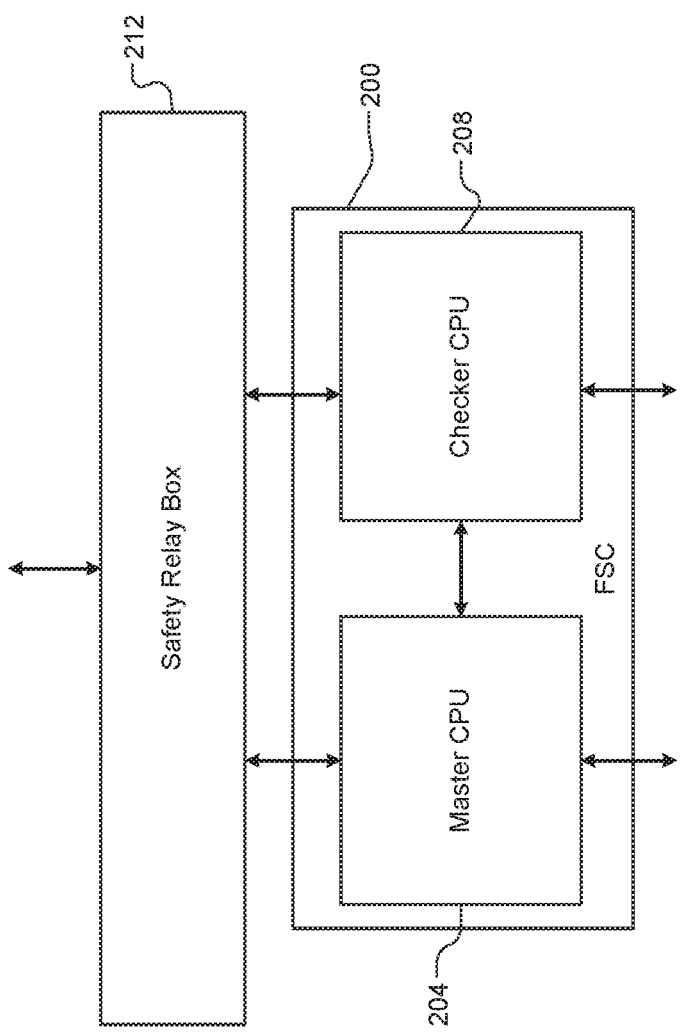
FIG. 2 is a functional block diagram of a fail-safe chassis according to the principles of the present disclosure.

Referring now to FIG. 2 a block diagram of an exemplary fail-safe chassis (FSC) according to the principles of the present disclosure is shown at 200. The FSC 200 includes a master CPU 204 and a checker CPU 208. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software.

For example, the master CPU 204 receives a request to perform a task from at least one of the safety critical hardware or software of an external safety system. The external safety system may be a system that is required to operate according to a predetermined safety standard, such as a railway system. The railway system includes safety critical hardware and software. The safety critical hardware and software interact with components of the railway system in order to control aspects of the railway system. For example, the safety critical hardware and software controls a train operating within the railway system.

The request to perform a task may include, but is not limited to, determining a status of a hardware component, engaging a brake of the railway system, or indicating to an operator of the railway system a location of a train operating within the railway system. The request to perform a task is received in the form of a packet. For example, the request to perform a task may be one of the plurality of incoming data packets.

Simultaneously, the checker CPU 208 receives a copy of the same request. Each of the master CPU 204 and the checker CPU 208 is configured to communicate a copy of the requested task to the other of the master CPU 204 and the checker 208. Prior to the master CPU 204 performing the requested task, the master CPU 204 and the checker CPU 208 compare the requested task received by each of the master CPU 204 and the checker CPU 208.

When the requested tasks are identical, the master CPU 204 and the checker CPU 208 communicate the requested task to the safety critical hardware and software. For example, the master CPU 204 and the checker CPU CPU 208 generates an outgoing packet associated with the requested task. The outgoing packet includes operating data elements. The operating data elements may include a set of instructions that instruct one of the safety critical hardware and software to execute a predetermined procedure. For example, the operating data elements may instruct the safety critical software to execute a brake engaging procedure. The brake engaging procedure includes controlling at least one safety critical hardware component. The at least one hardware component may include a brake mechanism of the railway system.

Conversely, when the requested tasks are not identical, the master CPU 204 and the checker CPU 208 do not communicate the requested task to the safety critical hardware and software. In this way, the master CPU 204 verifies that the requested task is a valid request from a valid source (i.e., an external hardware component or software application.) For example only, the master CPU 204 receives erroneous requests to perform tasks due to external hardware failure, a software error, or an overall system malfunction.

The master CPU 204 and the checker CPU 208 include a mask register. The mask register is a programmable bit within the master CPU 204 and the checker CPU 208. A value stored in the mask register is indicates whether a requested task is a safety-relevant task. For example, the mask register is set to 1 when the system 100 determines a requested task is a safety-relevant task. Further, the health and safety application sets the mask register when the system 100 is initially started.

The master CPU 204 and checker CPU 208 each continuously generate a module health signal based on a determination of whether the requests tasks are identical. When the master CPU 204 and the checker CPU 208 determine the requested tasks are identical, the master CPU 204 and the checker CPU 208 continuously generate the module health signal pulse. When the master CPU 204 and the checker CPU 208 determine the requested tasks are not identical, the master CPU 204 and the checker CPU 208 de-assert the module health signal pulse.

The master CPU 204 and the checker CPU 208 generate a chassis health signal pulse based on a plurality of module health signal pulse generated by each of a plurality of modules associated with the FSC 200. The FSC 200 includes similar features as those described with respect to the active FSC 104. For example, the FSC 200 includes the front blades 124*a*-128*f* as described above. Each of the modules within the FSC 200 continuously generates a module health signal (as described above). The master CPU 204 generates a first chassis health signal pulse when the plurality of module health signals indicates the FSC 200 is healthy. In other words, the first chassis health signal pulse is continuously asserted (i.e., set to 1) when the mask register indicates the requested task is safety relevant and the plurality of module health signals indicate the FSC 200 is healthy.

It is understood that when the mask register indicates the requested task is not safety relevant (i.e., the mask register is set to 0) the first module health signal pulse may be de-asserted. However, safety relevant procedures (i.e., forcing the active FSC 204 to a safe state) will not be executed. In this way, failover/failsafe procedures are only implemented when a fault occurs during a safety relevant task. The chassis health signal pulse is indicative of the overall health of the FSC 200.

It is understood that principles described with respect to the master CPU 204 apply to the checker CPU 208. The checker CPU 208 generates a second chassis health signal pulse based on a plurality of module health signal pulse generated by each of a plurality of modules associated with the FSC 200. The checker CPU 208 continuously generates the second chassis health signal pulse when the plurality of module health signals indicates the FSC 200 is healthy. The master CPU 204 communicates a first chassis health signal pulse to a safety relay box 212. Similarly, the checker CPU 208 communicates a second chassis health signal pulse to a safety relay box 212.

The safety relay box module 212 selectively determines whether the FSC 200 will operate as an active FSC based on a plurality of chassis health signals. For example, the safety relay box module 212 begins receiving a chassis health signal pulse from the master CPU 204 when the FSC 200 is initiated. The safety relay box 212 also begins receiving a chassis health signal pulse from the checker CPU 208. The safety relay box module 212 determines whether the FSC 200 will be elected as the active FSC based on the chassis health signals.

In some implementations, the safety relay box module 212 also receives a plurality of chassis health signal pulses from another FSC. The safety relay box module 212 determines whether the FSC 200 or the other FSC will be elected as the active FSC based on the plurality of chassis health signal pulses. For example, the safety relay box module 212 first determines whether one of the FSC 200 or the other FSC is healthy. The safety relay box module 212 determines the FSC 200 is healthy when the chassis health signal pulses received from the FSC 200 indicate the FSC 200 is healthy. For example, the safety relay box 212 determines the FSC 200 is healthy when the safety relay box 212 receives a chassis health signal from the FSC 200.

Similarly, the safety relay box module 212 determines the other FSC is healthy when the plurality of chassis health signal pulses received from the other FSC indicate the other FSC is healthy. When safety relay box module 212 determines that both of the FSC 200 and the other FSC are healthy, the safety relay box module 212 elects an active FSC based on which of the FSC 200 and the other FSC communicated one of the plurality of chassis health signal pulses first. For example, when the FSC 200 communicates a signal to the safety relay box module 212 before the other FSC communicates a signal to the safety relay box module 212, the safety relay box module 212 elects the FSC 200 as the active FSC.

The safety relay box module 212 monitors the health of the active FSC. For example, the safety relay box module 212 receives the first and second chassis health signal pulses from the FSC 200. The safety relay box module 212 determines whether a fault has occurred in the FSC 200 based on the first and second chassis health signal pulses. The safety relay box 212 determines a fault has occurred in the FSC 200 when at least one of the first and second chassis health signal pulses is indicative of a mismatch of the requested tasks. In other words, the safety relay box module 212 determines a fault has occurred when the safety relay box module 212 does not receive one of the first and second chassis health signal pulses.

The safety relay box module 212 generates a failsafe signal when the safety relay box module 212 determines a fault has occurred in the FSC 200. The safety relay box module 212 communicates the failsafe signal to the FSC 200. The FSC 200 determines whether to enter the safe state based on the failsafe signal. For example, the FSC 200 enters the safe state when the FSC 200 receives the failsafe signal. Conversely, the FSC 200 will continue to operate in the active FSC mode unless the FSC 200 receives a failsafe signal.

Alternatively, the FSC 200 may enter a standby state when the FSC 200 does not receive an active signal. The safety relay box module 212 communicates the active signal when the safety relay box module 212 determines the FSC 200 is to operate as the active FSC. The safety relay box module 212 continuously communicates the active signal to the FSC 200. When the safety relay box module 212 determines the FSC 200 is faulty, the safety relay box module 212 does not communicate an active signal to the FSC 200. The FSC 200 then operates in the standby state.

In some implementations, the plurality of chassis health signal pulses are implemented as dynamic pulse signals to eliminate undetected, latent failure modes. The safety relay box module 212 is configured to determine whether a pulse signal is stuck at 0 or stuck at 1. For example, the safety relay box 212 receives a first pulse signal from the master CPU 204. The safety relay box module 212 is configured to wait a predetermined period of time.

For example, the predetermined period of time may be a period corresponding to a time long enough for a dynamic pulse to reset. The safety relay box module 212 determines the first pulse signal is stuck when the first pulse signal has not been reset after the predetermined period. The safety relay box module 212 determines a fault in the master CPU 204 when then safety relay box module 212 determines the first pulse signal is stuck. The safety relay box module 212 generates a failsafe signal based on determining a fault in the master CPU 204.

Figure 3:
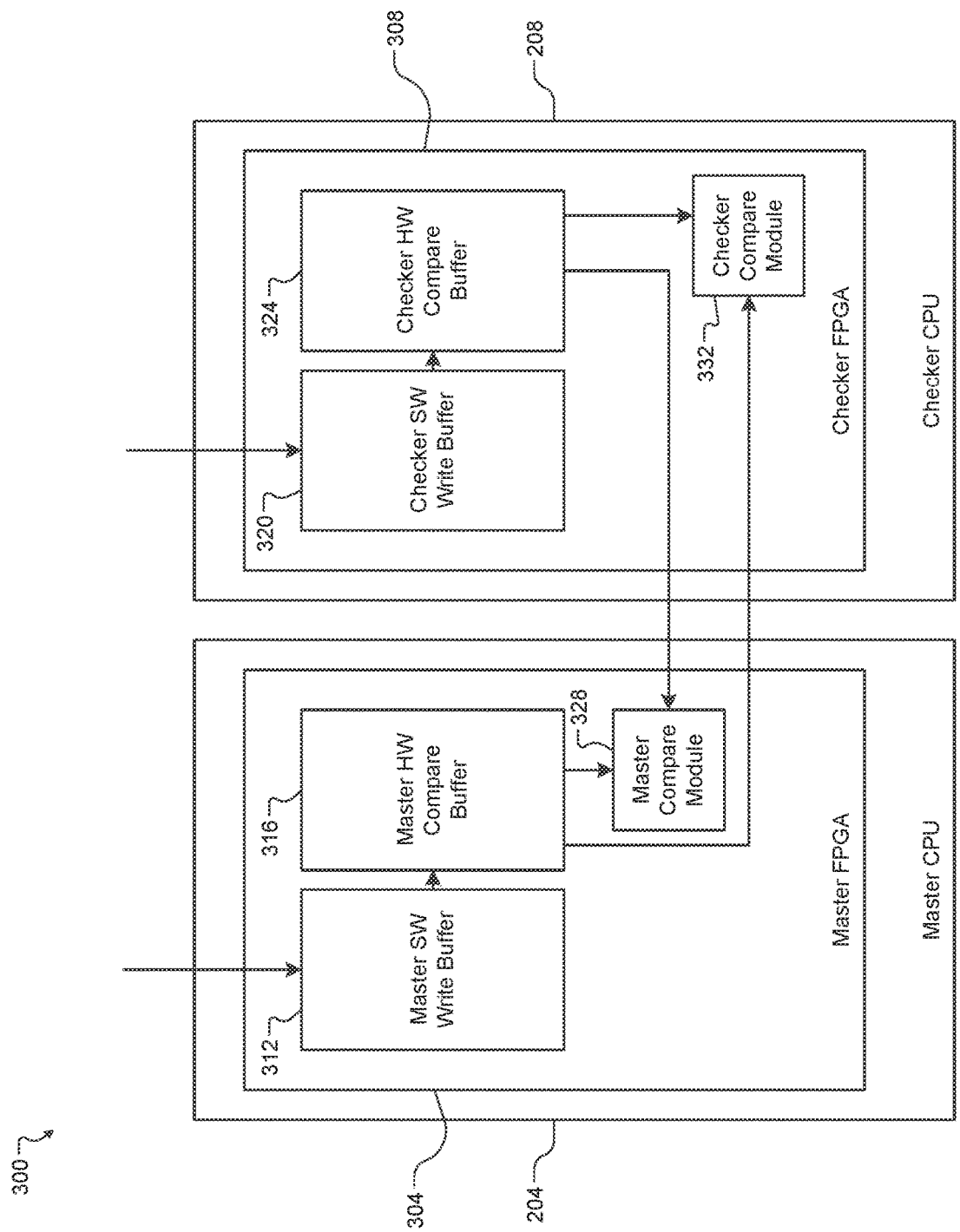
FIG. 3 is a functional block diagram of task based voting system according to the principles of the present disclosure.

In some embodiments, the system 100 implements a task based voting system 300 as shown in FIG. 3. The task based voting system 300 includes the master CPU 204 and the checker CPU 208. Each of the master CPU 204 and the checker CPU 208 include a field-programmable gate array (FPGA) configured to execute voting logic. For example, the master CPU 204 includes a master FPGA 304 and the checker CPU 208 includes a checker FPGA 308. Each of the master FPGA 304 and the checker FPGA 308 is configured to implement task based voting logic. Further, each of the master FPGA 304 and the checker FPGA 308 is synchronized to a reference clock.

The reference clock is a 25 megahertz (MHz) clock within the system 100. The reference clock is a common reference clock that each module within the system 100 syncs with. Each module within the system 100 includes a phase locked loop that is synchronized with the reference clock. For example, an IOU module within the system 100 may include an IOU clock that counts at a first interval. The IOU module includes a first phase locked loop that determines a reference point between the first interval and a reference clock interval. When the IOU module communicates with another module within the system 100, the IOU module determines a current reference clock time based on the reference point between the first interval and the reference clock interval. In this manner, each module within the system 100 may reference a time on the reference clock that is common to each module in order to communicate within the system 100.

Each of the master CPU 204 and the checker CPU 208 is configured to execute a software application external to the system 100. For example, the master CPU 204 executes tasks requested by the railway application as described above. The master CPU 204 is configured to execute a first copy of the railway application (first copy). The checker CPU 208 is configured to execute second copy of the railway application (second copy). Each of the first copy and the second copy is configured to execute tasks simultaneously. For example, when the system 100 is restarted, each of the master CPU 204 and the checker CPU 208 initiates the first copy and the second copy respectively. The first copy and the second copy are synchronized to the reference clock in order to execute tasks simultaneously.

Each of the master FPGA 304 and the checker FPGA 308 is configured to execute one of a plurality of voting modes. In one implementation, the master FPGA 304 and the checker FPGA 308 are configured to execute a task based voting mode. For example, the master FPGA 304 includes a master software (SW) write buffer 312 and a master hardware (HW) compare buffer 316. The checker FPGA 308 includes a checker SW write buffer 320 and a checker HW compare buffer 324.

The first copy of the railway application writes a first plurality of tasks to be performed by the master CPU 204 to the master SW write buffer 312 during a first cycle of the reference clock. Simultaneously, the second copy writes a second plurality of tasks to be performed by the master CPU 204 to the checker SW write buffer 320 during the first cycle of the reference clock. As described above, the master CPU 204 executes tasks associated with the railway application. The checker CPU 208 is identical to the master CPU 204. However, only the master CPU 204 performs tasks associated with the railway application.

The checker CPU 208 is configured to run in lockstep with the master CPU 204, however, the checker CPU 208 does not perform the tasks associated with the railway application. It is understood that the first copy and second copy are identical applications. It is further understood that the first copy and the second copy operate independent of one and other. The task based voting system 300 determines whether a fault has occurred in the system 100 based on voting mismatches in the tasks written to the master SW buffer 316 and the checker SW buffer 320.

In one implementation, the master FPGA 304 copies the first plurality of tasks within the master SW write buffer 312 to the master HW compare buffer 316 during a second cycle of the reference clock. The second cycle of the reference clock may occur immediately after the first cycle or after a predetermined number of cycles after the first cycle. Simultaneously, the checker FPGA 308 copies the second plurality of tasks within the checker SW write buffer 320 to the checker HW compare buffer 324 during the second cycle. In this manner, the plurality of tasks written by the railway application to the master SW write buffer 312 and the checker SW write buffer 316 during the first cycle are moved to the master HW compare buffer 320 and the checker HW compare buffer 324 during the second cycle.

The first plurality of tasks is then compared to the second plurality of tasks. In the example implementation, the master FPGA 304 includes a master compare module 328 and the checker FPGA 308 includes a checker compare module 332. The master compare module 328 receives a first task from the master HW compare buffer 316 and a second task from the checker HW compare buffer 324. The master compare module 328 compares the first task to the second task. The master compare module 328 generates a first voting signal based on the comparison. For example, when the master compare module 328 determines that the first task and the second task are identical, the master compare module 328 generates the first voting signal. The master compare module 328 communicates the first voting signal to the master CPU 204. Conversely, when the master compare module 328 determines that the first task and the second task are not identical, the master compare module 328 does not generate the first voting signal.

Similarly, the checker compare module 332 receives the first task from the master HW compare buffer 316 and the second task from the checker HW compare buffer 324. The checker compare module 332 compares the first task to the second task. The checker compare module 332 then generates a second voting signal based on the comparison. For example, when the checker compare module 332 determines that the first task and the second task are identical, the checker compare module 332 generates the second voting signal. The checker compare module 332 communicates the second voting signal to the master CPU 204. Conversely, when the checker compare module 332 determines that the first task and the second task are not identical, the checker compare module 332 does not generate the second voting signal.

The master CPU 204 determines whether a voting mismatch occurred in the master FPGA 304 and the checker FPGA 308 based on the first voting signal and the second voting signal. A voting mismatch may be indicative of a fault within the system 100. By way of non-limiting example, a voting mismatch may occur when one of the first copy and the second copy does not write to the master SW write buffer 312 or the checker SW write buffer 320 during the first cycle. Alternatively, a voting mismatch may occur when one of the first copy and the second copy partially writes data to the master SW write buffer 312 or the checker SW write buffer 320 during the first cycle.

In one implementation, the master CPU 204 determines no voting mismatches occurred when the master CPU 204 receives the first voting signal and the second voting signal. The master CPU 204 continuously generates the module health signal as described above. The master CPU 204 determines a voting mismatch occurred when the master CPU 204 does not receive at least one of the first voting signal and the second voting signal.

When the master CPU 204 determines a voting mismatch has occurred the master CPU 204 de-asserts the module health signal. It is understood that the master CPU 204 may de-assert a previously asserted module health signal. For example, the module health signal may be a continuously asserted signal. When the master CPU 204 determines a voting mismatch has occurred, the master CPU 204 de-asserts the module health signal.

Figure 4:
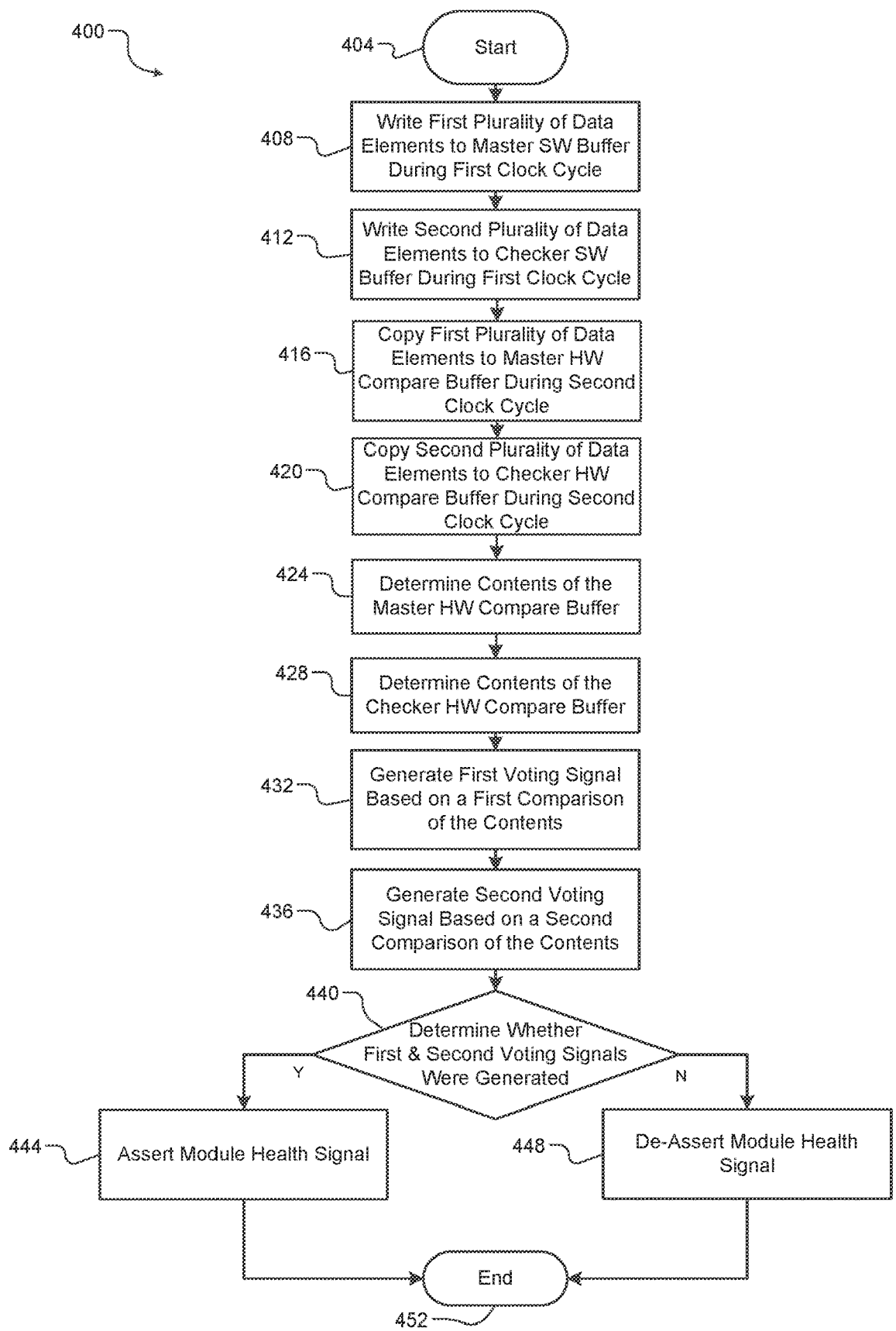
FIG. 4 is a flow diagram illustrating a task based voting computer operating method according to the principles of the present disclosure.

Referring now to FIG. 4 a method 400 for implementing a task based voting computer system begins at 404. At 408, the method 400 writes a first plurality of tasks to the master SW write buffer 312 during a first clock cycle. At 412, the method 400 writes a second plurality of tasks to the checker SW write buffer 320 during the first clock cycle. At 416, the method 400 copies the first plurality of tasks to the master HW compare buffer 316 during a second clock cycle. At 420, the method 400 copies the second plurality of tasks to the checker HW compare buffer 324 during the second clock cycle. At 424, the method 400 receives a first task form the master HW compare buffer 324.

At 428, the method 400 receives a second task from the checker HW compare buffer 324. At 432, the method 400 generates a first voting signal based on a first comparison between the first task and the second task. At 436, the method 400 generates a second voting signal based on a second comparison between the first task and the second task. At 440, the method 400 determines whether the first voting signal and the second voting signal were generated. If true, the method 400 continues at 444. If false, the method 400 continues at 448. At 444, the method 400 continuously generates a module health signal. At 448, the method 400 de-asserts the module health signal. The method 400 ends at 452.

Figure 5:
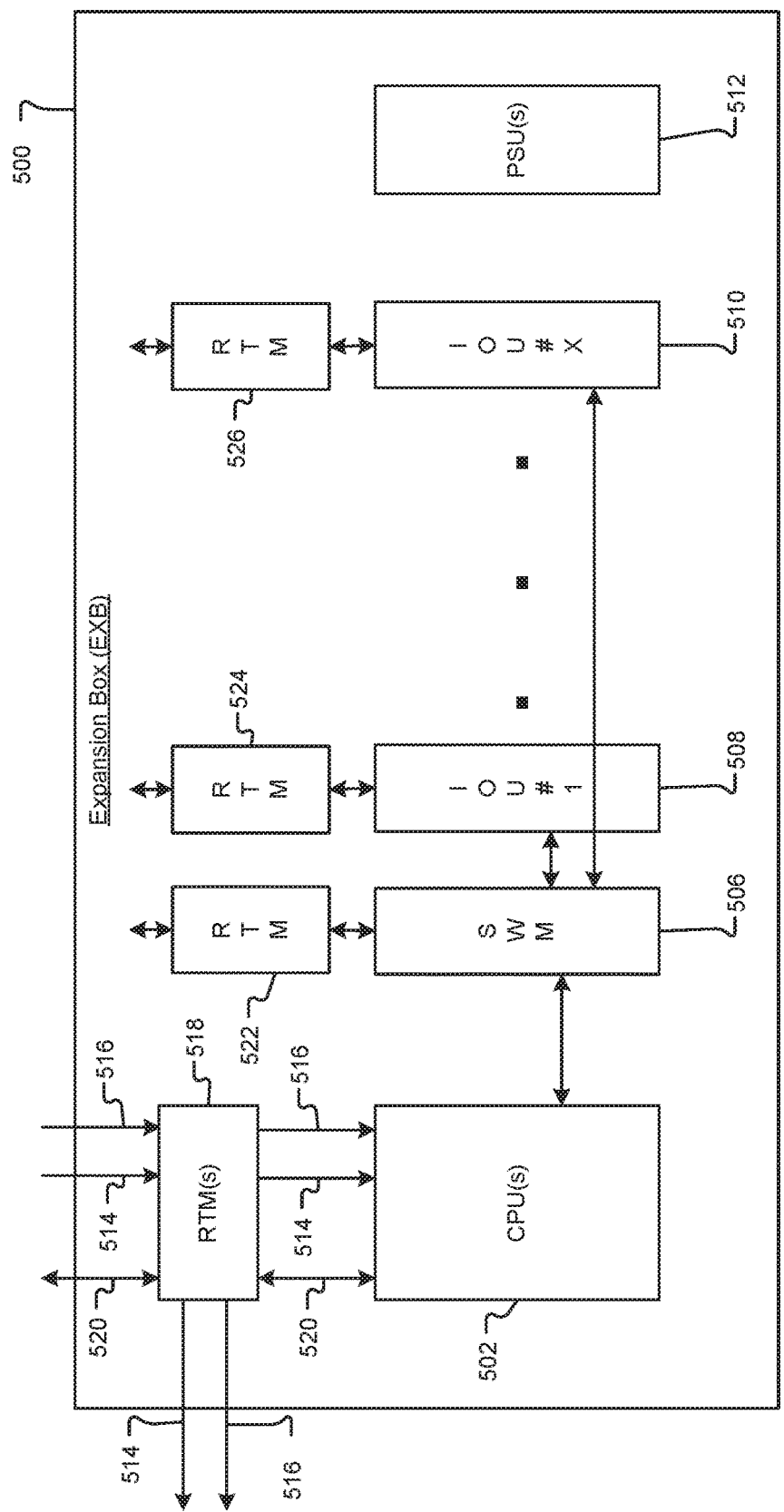
FIG. 5 is a functional block diagram of an expansion box for safety applications according to the principles of the present disclosure.

Referring now to FIG. 5, a functional block diagram of one example of an expansion box (EXB) 500 for safety applications is shown. In one example, the EXB 500 implements a similar architecture to that of the active FSC 104 and standby FSC 108 discussed above with regard to FIG. 1. Specifically, the EXB 500 may include one or more CPUs 502 and corresponding one or more CPU RTM(s) 518, a switch module (SWM) 506 and corresponding SWM RTM 522, I/O unit modules 508-510 and corresponding I/O unit module RTMs 524-526, and one or more PSUs 512.

However, the EXB 500 will typically include many more I/O unit modules than a standard FSC, such as FSC 104 or FSC 108. In addition, one or more of the I/O modules of the EXB 500 will typically include more ports and channels than any of the I/O modules of the active FSC 104 and/or standby FSC 108 discussed above.

For example, where a typical FSC may only include six I/O modules (e.g., I/O modules 128a-128f of FSC 104 shown in FIG. 1), an EXB, such as EXB 500, may include ten or more I/O modules. The example EXB 500 shown in FIG. 5 includes I/O module #1 508 through I/O module # X 510, where X may take on any value, but is typically greater than six. In one example, the EXB 500 may include ten (10) 9U expansion I/O modules (EIOU) and one (1) 4U I/O module (xIOU) in a single chassis. In contrast, a typical FSC (e.g., FSC 104) may only include six (6) 4U I/O modules.

By accommodating a variety of I/O types and allowing more ports and channels on each I/O module, the improved processing capability of the example EXB 500 may effectively reduce the number of chassis required to construct large scale applications. In addition, the higher I/O capacities afforded by the example EXB 500 may effectively handle the increasing data throughput requirements of modern safety application systems.

In an example implementation, the EXB 500 is configured to implement task-based voting as one method of detecting a fault in a fault-tolerant fail safe computer system. More specifically, the EXB 500 may be configured to implement task-based voting in accordance with the techniques discussed above with regard to FIGS. 1-4. For example, in one implementation, the CPU(s) 502 may include a master CPU and a checker CPU connected to the I/O unit modules 508-510 via the SWM 506. In such an implementation, the master and checker CPUs of the CPU(s) 502 may be utilized to implement task-based voting, such as a two-out-of-two (2oo2) voting mechanism. In another example implementation, the CPU(s) 502 and SWM 506 may be implemented on a single card, sharing a single RTM (e.g., RTM 518).

The example EXB 500 also differs from the FSCs 104, 108 discussed with regard to FIG. 1 above in that, in some implementations, the example EXB 500 includes two or more PSUs 512. For example, the EXB 500 may include redundant AC PSUs, either of which is capable of powering all of the components of the EXB 500. In this example, a first PSU may be designated the active PSU and be tasked with supplying power to the components of the EXB 500. Then, if the active PSU fails, power supply responsibility may be transferred to the standby PSU to ensure continuous operation of the EXB 500. Software running on the CPU(s) 502, for example, may be utilized to monitor the health of the PSU(s) 512 (e.g., via communication over a suitable communication channel, such as an Ethernet communication channel).

In one example, the SWM 506 and I/O unit modules 508-510 may be connected via one or more Ethernet communication channels. Similarly, in example implementations, the SWM 506 may be connected to CPU(s) 502 via one or more Ethernet communication channels. In another example (e.g., in the example implementation in which the CPU(s) 502 and SWM 506 are implemented as a single card), the I/O unit modules 508-510 may be connected to the combination CPU/SWM via one or more Versa Module Europa (VME) buses. Of course, those having ordinary skill will recognize that other suitable communication channels employing suitable communication protocols may be suitably employed without deviating from the teachings of the present disclosure.

Each I/O unit module is configured to transmit a health status signal to the CPU(s) 502 indicating whether it is functioning properly, or whether there is a fault. In some examples, each I/O unit module may send a periodic health status signal indicating that it is functioning properly (e.g., "I'm well" messages). In such an example, if a predetermined amount of time has passed since the CPU(s) 502 have received a health status signal indicating that a particular I/O unit module (e.g., IOU #1 508) is functioning properly, the CPU(s) 502 will treat the silence as fault in the I/O unit module and will respond accordingly (which response is discussed in additional detail below). In another example, each I/O unit module may send a constant health status signal indicating that it is functioning properly. In this example, if the CPU(s) 502 stop receiving the constant health status signal (or, alternatively, if the value of the constant health status signal changes, or is de-asserted, such that it no longer corresponds to a properly functioning I/O unit module), the CPU(s) 502 will treat such a situation as though a fault has been detected in the I/O unit module and will respond accordingly.

In one example, the constant health status signal may be dynamic, such that an "I'm well" status may be communicated via a first signal pattern (e.g., a predefined pattern of high/low values over a predefined period of time), while a fault status may be communicated with a second signal pattern (e.g., a different predefined pattern of high/low values over a predefined period of time). Further still, in some instances where the constant health signal is dynamic, a detection that the constant health signal does not match either the predefined "I'm well" pattern or the predefined fault pattern may be interpreted as indicative of a fault.

An EXB 500 is considered to be healthy and suitable for use as part of an active fault-tolerant fail safe subsystem when all of the individual components of the EXB 500 (including, but not limited to, I/O unit modules 508-510) are healthy. In one example, upon detection that one or more components of the EXB 500 are not healthy (e.g., a detection by the CPU(s) 502 that IOU #1 508 is not healthy), the EXB 500 is configured to generate an EXB health signal 520 indicating a fault in the EXB 500. In another example, the EXB health signal 520 may indicate that all of the components of the EXB 500 are healthy. In one example, the EXB health signal 520 may be generated by the CPU(s) 502 of the EXB 500 and transmitted externally from the EXB 500 via the CPU(s) RTM 518.

In one example, the EXB health signal 520 may be dynamic, such that a healthy status may be communicated via a first signal pattern (e.g., a predefined pattern of high/low values over a predefined period of time), while a fault status may be communicated with a second signal pattern (e.g., a different predefined pattern of high/low values over a predefined period of time). Further still, in some instances where the EXB health signal 520 is dynamic, a detection that the EXB health signal 520 does not match either the predefined healthy pattern or the predefined fault pattern may be interpreted as indicative of a fault condition.

Figure 6:
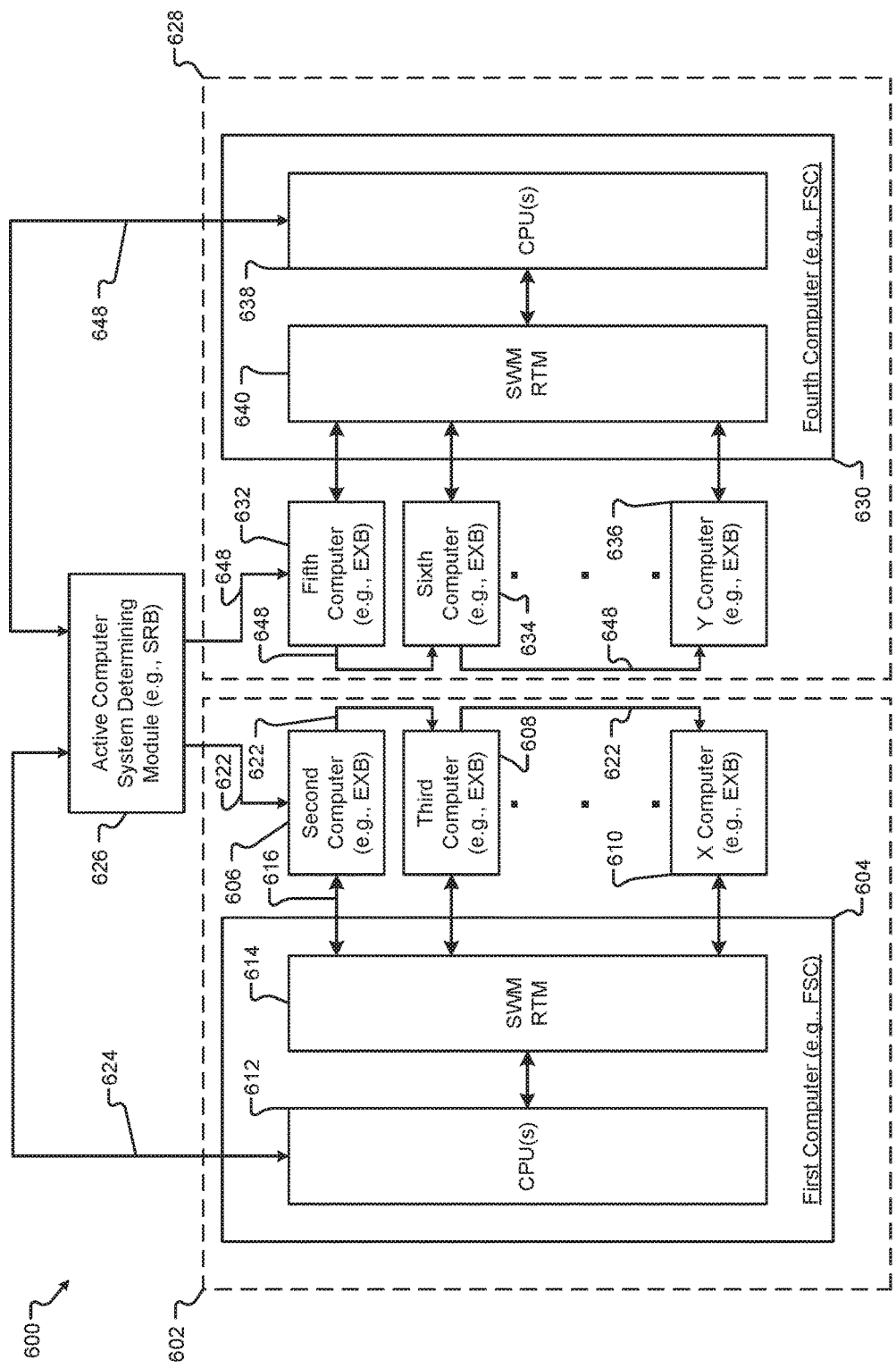
FIG. 6 is a functional block diagram of a fault-tolerant failsafe computer system incorporating expansion boxes according to the principles of the present disclosure.

For example, and as discussed in additional detail with regard to FIG. 6 below, an EXB health signal 520 indicating a fault in the EXB 500 may be communicated to a FSC included as part of the same active fault-tolerant fail safe subsystem, via a suitable communication channel, such as, but not limited to, an Ethernet communication channel. According to some implementations, the FSC may then generate a signal notifying an active computer system determining module (e.g., the active computer system determining module 626 shown in FIG. 6) of a fault in the active fault-tolerant fail safe subsystem. This, in turn, may cause the active computer system determining module to place the active fault-tolerant fail safe subsystem (including the EXB 500 and FSC) in standby mode while activating another fault-tolerant fail safe subsystem. The process for transferring active status between various fault-tolerant fail safe subsystems is illustrated in FIG. 6 and discussed in additional detail below.

In some implementations, the EXB 500 is configured to receive a system health signal 514 and/or an active/standby signal 516. The system health signal 514 may indicate whether all of the computers included as part of the same fault-tolerant fail safe subsystem as the EXB (including, for example, a FSC and/or one or more additional EXBs) are healthy and, thus, whether the EXB 500 should enable one or more of its input ports (e.g., input ports of the I/O unit modules 508-510). For example, when the system health signal 514 indicates that all of the computers included as part of the same fault-tolerant fail safe subsystem as the EXB 500 are healthy, the EXB 500 may be configured to enable one or more of its input ports. Conversely, and by way of example, when the system health signal 514 indicates that any of the computers included as part of the same fault-tolerant fail safe subsystem as the EXB 500 are not healthy, the EXB 500 may be configured to disable one or more of its input ports.

The active/standby signal 516 may indicate whether the EXB 500 and any other computers connected thereto should be in active or standby mode and, thus, whether the EXB 500 should enable one or more of its output ports (e.g., output ports of the I/O unit modules 508-510). For example, when the active/standby signal 516 constitutes an active signal, the EXB 500 may be configured to enable one or more of its output ports. Conversely, and by way of example, when the active/standby signal 516 constitutes a standby signal, the EXB 500 may be configured to disable one or more of its output ports.

In one example, the system health signal 514 may be dynamic, such that a healthy status may be communicated via a first signal pattern (e.g., a predefined pattern of high/low values over a predefined period of time), while a fault status may be communicated with a second signal pattern (e.g., a different predefined pattern of high/low values over a predefined period of time). Further still, in some instances where the system health signal 514 is dynamic, a detection that the system health signal 514 does not match either the predefined healthy pattern or the predefined fault pattern may be interpreted as indicative of a fault condition.

Similarly, in one example, the active/standby signal 516 may be dynamic, such that an active status may be communicated via a first signal pattern (e.g., a predefined pattern of high/low values over a predefined period of time), while a standby status may be communicated with a second signal pattern (e.g., a different predefined pattern of high/low values over a predefined period of time). Further still, in some instances where the active/standby signal 516 is dynamic, a detection that the active/standby signal 516 does not match either the predefined active pattern or the predefined standby pattern may be interpreted as indicative of a standby condition.

In one example, the system health signal 514 and an active/standby signal 516 may be transmitted to the EXB 500 (e.g., to the CPU(s) 502 of the EXB 500 via the CPU(s) RTM 518) from an active computer system determining module. In another example, the system health signal 514 and an active/standby signal 516 may be transmitted to the EXB 500 (e.g., to the CPU(s) 502 of the EXB 500 via the CPU(s) RTM 518) from another EXB "upstream" from the EXB 500, as discussed in additional detail with regard to FIG. 6 below.

In another example, the EXB 500 (e.g., the CPU(s) RTM 518 of the EXB 500) may be configured to forward the system health signal 514 and/or active/standby signal 516 "downstream" to another computer, such as another EXB, as discussed in additional detail with regard to FIG. 6 below.

Referring now to FIG. 6, a functional block diagram of one example of a fault-tolerant failsafe computer system 600 incorporating one or more expansion boxes is shown. The fault-tolerant failsafe computer system 600 includes a first computer system 602 and a second computer system 628. In one example, the first computer system 602 and the second computer system 6238 are redundant computer systems.

Each of the first and second computer systems 602, 628 are connected to an active computer system determining module 626. In some examples, the active computer system determining module 626 may be implemented as a safety relay box module, such as the safety relay box module 144 of FIG. 1. In another example, the active computer system determining module 626 may be implemented as a direct connect algorithm (DCA), as described in U.S. Pat. No. 9,367,375, assigned to the instant applicant, and incorporated by reference herein in its entirety. The active computer system determining module 626 is configured to generate active/standby signals so as to elect a given computer system (e.g., the first computer system 602) as the active computer system and another computer system (e.g., the second computer system 628) as the standby computer system, according to examples of the present disclosure.

The first computer system 602 includes a first computer 604 operatively connected to the active computer system determining module 626, a second computer 606 operatively connected to the first computer 604 and the active computer system determining module 626, and a third computer 608 operatively connected to the second computer 606 and the first computer 604. In some examples, one or more additional computers, such as X computer 610, may also be included as part of the first computer system 602. Each additional computer, such as X computer 610, may be operatively connected to the first computer and a preceding computer. In this manner, and as described in additional detail below, one or more computers (e.g., the second computer 606, the third computer 608, and X computer 610) may be daisy-chained together and driven by the first computer 604.

In one example, the first computer 602 may constitute a FSC, such as FSC 104 discussed in regard to FIG. 1 above. For purposes of simplicity, many of the sub-components of the first computer 604 are omitted from FIG. 6. For example, in practice, the first computer 602 may include one or more I/O unit modules, one or more RTMs, one or more PSUs, etc.

In the simplified version of the first computer 602 illustrated in FIG. 6, the first computer 602 includes one or more CPUs 612 and a SWM RTM 614 operatively connected thereto. In one example, the CPU(s) 612 and SWM RTM 614 are operatively connected via a suitable communication channel, such as an Ethernet communication channel. Similarly, in some examples, the second computer 606, third computer 608, and X computer 610 are operatively connected to the first computer (e.g., the SWM RTM 614 of the first computer 602) via respective communication channels, such as Ethernet channels. In one example, the second computer 606 may be operatively connected to the third computer 608 over any suitable communication channel known in the art including, but not limited to, Ethernet or VME. Similarly, the third computer 608 may be operatively connected to the X computer 610 over any suitable communication channel known in the art including, but not limited to, Ethernet or VME.

In one example, each of the second computer 606, third computer 608, and X computer 610 (as well as any intervening computers) may be implemented as an EXB, such as the EXB discussed with regard to FIG. 5 herein. According to this example, a plurality of EXBs may be daisy-chained together and driven by the first computer 604 as part of the first computer system 602.

The second computer system 628 mirrors the first computer system 602 in terms of components and architecture, and includes a fourth computer 630 operatively connected to the active computer system determining module 626, a fifth computer 632 operatively connected to the fourth computer 630 and the active computer system determining module 626, and a sixth computer 634 operatively connected to the fifth computer 632 and the fourth computer 630. In some examples, one or more additional computers, such as Y computer 636, may also be included as part of the second computer system 628. Each additional computer, such as Y computer 636, may be operatively connected to the fourth computer and a preceding computer. In this manner, one or more computers (e.g., the fifth computer 632, the sixth computer 634, and Y computer 636) may be daisy-chained together and driven by the fourth computer 630.

In one example, the fourth computer 630 may constitute a FSC, such as FSC 108 discussed in regard to FIG. 1 above. For purposes of simplicity, many of the sub-components of the fourth computer 630 are omitted from FIG. 6. For example, in practice, the fourth computer 630 may include one or more I/O unit modules, one or more RTMs, one or more PSUs, etc.

In the simplified version of the fourth computer 630 illustrated in FIG. 6, the fourth computer 630 includes one or more CPUs 638 and a SWM RTM 640 operatively connected thereto. In one example, the CPU(s) 638 and SWM RTM 640 are operatively connected via a suitable communication channel, such as an Ethernet communication channel. Similarly, in some examples, the fifth computer 632, sixth computer 634, and Y computer 636 are operatively connected to the fourth computer (e.g., the SWM RTM 640 of the fourth computer 630) via respective communication channels, such as Ethernet channels. In one example, the fifth computer 632 may be operatively connected to the sixth computer 634 over any suitable communication channel known in the art including, but not limited to, Ethernet or VME. Similarly, the sixth computer 634 may be operatively connected to the Y computer 636 over any suitable communication channel known in the art including, but not limited to, Ethernet or VME.

In one example, each of the fifth computer 632, sixth computer 634, and Y computer 636 (as well as any intervening computers) may be implemented as an EXB, such as the EXB discussed with regard to FIG. 5 herein. According to this example, a plurality of EXBs may be daisy-chained together and driven by the fourth computer 630 as part of the second computer system 628.

In operation, the example fault-tolerant failsafe computer system 600 may function as follows. For purposes of this example, the first computer system 602 will be treated, initially, as the active computer system and the second computer system 628 will be treated, initially, as the standby computer system. Accordingly, at the outset, the output ports (e.g., output ports of the I/O unit modules included as part of each computer) of the computers 604, 606, 608, 610 included as part of the first computer system 602 will be enabled. Correspondingly, at the outset, the output ports (e.g., output ports of the I/O unit modules included as part of each computer) of computers 630, 632, 634, 636 included as part of the second computer system 628 will be disabled.

Upon detection of a fault in the second computer 606 (e.g., a fault in one of the I/O unit modules included as part of the second computer 606), the second computer 606 is configured to transmit a second computer health signal 616 indicating the fault in the second computer 606 (or, as the case may be, stop transmitting an "I'm well" signal, or de-assert a signal to a value that no longer corresponds to an "I'm well" state). The first computer 604 is configured to receive the second computer health signal 616 and generate a first computer system health signal 624 in response thereto. The first computer system health signal 624 may indicate a fault in the first computer 604 and/or second computer 606. The first computer 604 is further configured to transmit the first computer system health signal 624 indicating the fault in the first computer system 602 to the active computer system determining module 626. In one example, the first computer 602 is configured to generate the first computer system health signal 624 by de-asserting a pre-existing first computer system health signal (e.g., changing a value of a pre-existing first computer system health signal).

The active computer system determining module 626 is configured to receive the first computer system health signal 624 and generate a standby signal 622 in response thereto. The standby signal 622 may be transmitted from the active computer system determining module 626 to the second computer 606. The second computer 606 is configured to receive the standby signal 622 and disable one or more output ports of the second computer 606 based on the standby signal 622. In some examples, the standby signal 622 may cause the second computer 606 to power off any or all I/O unit modules of the second computer 606. In addition, and although not shown in FIG. 6, the active computer system determining module 626 may also transmit to the second computer 606 a system health signal indicating a health of the first computer system 602. As discussed below, such a system health signal may be propagated, along with the standby signal 622, to the third computer 608 and any additional computers (e.g., the X computer 610) downstream from the second computer 606 in the daisy-chain.

Continuing, the second computer 606 may be configured to forward the standby signal 622 (and, in some examples, the first computer system health signal) to the third computer 608. The third computer 608 may be configured to receive the standby signal 622 and disable one or more of its output ports based on the standby signal 622. In some examples, the standby signal 622 may cause the third computer 608 to power off any or all I/O unit modules of the third computer 608.

The standby signal 622 and, in some examples, the first computer system health signal may be propagated down the daisy-chain line of computers connected to the first computer 604 thereby disabling one or more of the output ports in each of the computers in the daisy-chain. In this manner, some or all of the output ports of the daisy-chained computers may be disabled, thereby placing the first computer system 602 in standby mode.

Concurrent to the generation of the standby signal 622 (i.e., during the same clock cycle or within a few clock cycles), the active computer system determining module 626 is configured to generate an active signal 648. In some examples, the active signal 648 may be generated by the active computer system determining module 626 in response to receiving the first computer system health signal 624. In this manner, the active computer system determining module 626 is configured to place the first computer system 602 in standby mode and activate the second computer system 628, as follows.

The active computer system determining module 626 is configured to generate an active signal 648 that is transmitted to the fourth computer 630 and fifth computer 632. Upon reception of the active signal 648 by the fourth computer 630, the fourth computer 630 is configured to enable one or more of its output ports based on the active signal 648. Similarly, upon reception of the active signal 648, the fifth computer 632 is configured to enable one or more of its output ports based on the active signal 648. In some examples, the active signal 648 may cause the fifth computer 632 to power on any or all I/O unit modules of the fifth computer 632. In addition, and although not shown in FIG. 6, the active computer system determining module 626 may also transmit to the fifth computer 632 a system health signal indicating a health of the second computer system 628. As discussed below, such a system health signal may be propagated, along with the active signal 648, to the sixth computer 634 and any additional computers (e.g., the Y computer 636) downstream from the fifth computer 632 in the daisy-chain.

Continuing, the fifth computer 632 may be configured to forward the active signal 648 (and, in some examples, the second computer system health signal) to the sixth computer 634. The sixth computer 634 may be configured to receive the active signal 648 and enable one or more of its output ports based on the active signal 648. In some examples, the active signal 648 may cause the sixth computer 634 to power on any or all I/O unit modules of the sixth computer 634.

The active signal 648 and, in some examples, the second computer system health signal may be propagated down the daisy-chain line of computers connected to the fourth computer 630 thereby enabling one or more of the output ports in each of the computers in the daisy-chain. In this manner, some or all of the output ports of the daisy-chained computers may be enabled, thereby placing the second computer system 628 in active mode.

Figure 7:
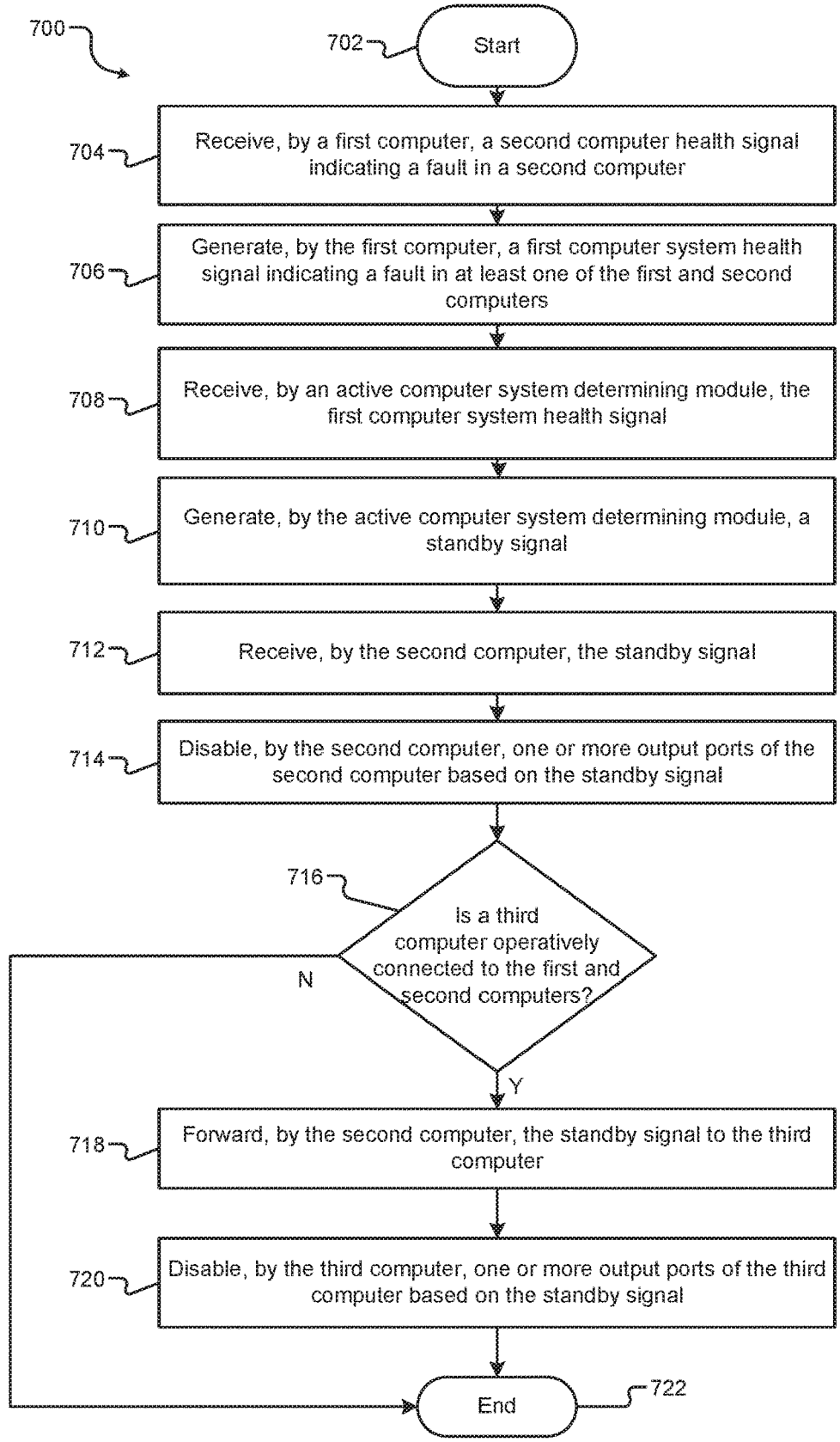
FIG. 7 is a flow diagram illustrating a method of switching the active computer system according to the principles of the present disclosure.

Referring now to FIG. 7, a method 700 for implementing a fail-safe fault-tolerant computer system begins at 702. At 704, a first computer receives a second computer health signal indicating a fault in a second computer. At 706, the first computer generates a first computer system health signal indicating a fault in the first and/or second computers. At 708, an active computer system determining module receives the first computer system health signal. At 710, the active computer system determining module generates a standby signal. At 712, the second computer receives the standby signal. At 714, the second computer disables one or more of its output ports based on the standby signal.

At 716, a determination is made as to whether a third computer is operatively connected to the first and second computers. If not, the method 700 ends at 722. However, if a third computer is operatively connected to the first and second computers, the method 700 proceeds to 718. At 718, the second computer forwards the standby signal to the third computer. At 720, the third computer disables one or more of its output ports based on the standby signal. The method 700 ends at 722.

Figure 8:
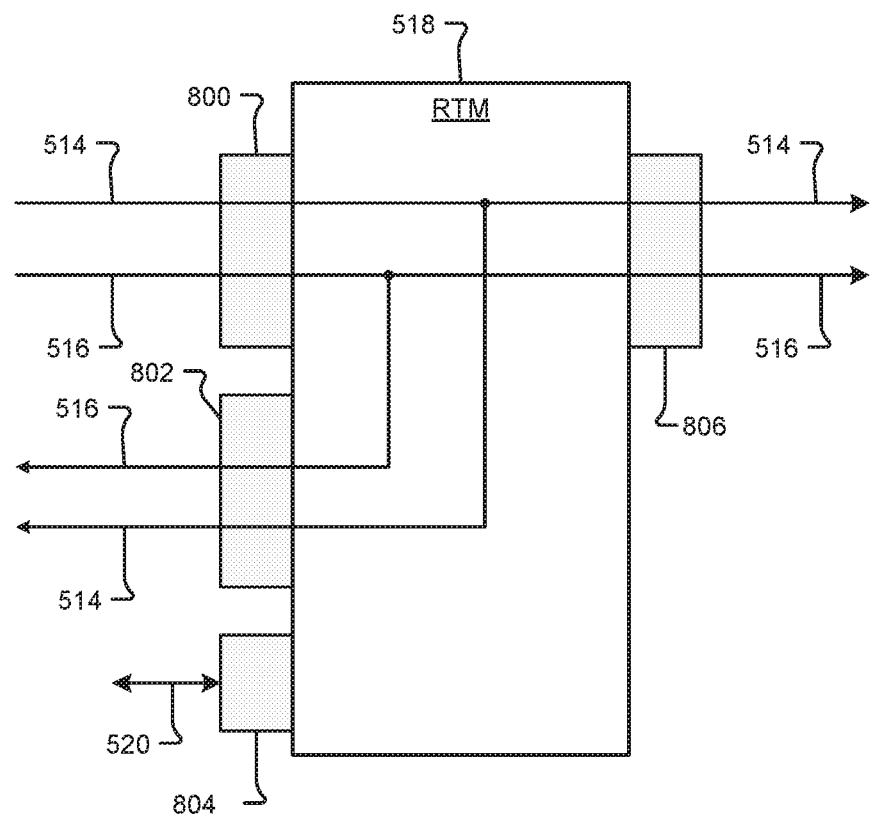
FIG. 8 is a functional block diagram of a rear transition module of an expansion box according to the principles of the present disclosure.

Referring now to FIG. 8, a functional block diagram of an example CPU RTM 518 of the example EXB 500 of FIG. 5 is shown. The CPU RTM 518 includes a plurality of ports 800, 802, 804, 806 for communicating with various components, as described below. For example, an input port 800 may receive a system health signal 514 and an active/standby signal 516. The system health signal 520 and active/standby signal 516 may be received by the input port 800 from (i) an upstream EXB (e.g., in a multiple EXB daisy-chain architecture, such as the architecture depicted in FIG. 6) or (ii) an active computer system determining module (e.g., active computer system determining module 626 shown in FIG. 6).

The CPU RTM 518 is configured to forward along the system health signal 514 and active/standby signal 516 to subcomponents within the same EXB as the CPU RTM 518, and to a downstream EXB. More specifically, a first output port 806 is configured to forward the system health signal 514 and active/standby signal 516 to I/O unit modules within the same EXB as the CPU RTM 518. The system health signal 514 and active/standby signal 516 may be routed through one or more CPUs (e.g., CPU(s) 502 of FIG. 5) on their way to the I/O unit modules. As discussed above, the system health signal 514 may be utilized to enable input ports of the I/O unit modules, while the active/standby signal 516 may be utilized to enable output ports of the I/O modules. A second output port 802 is configured to forward the system health signal 514 and active/standby signal 516 to a downstream EXB as part of a daisy-chained, multiple-EXB system, such as the system 600 of FIG. 6. In some examples, the system health signal 514 and active/standby signal 516 may be received by the input port 800 via a wired communication channel. Similarly, in some examples, the system health signal 514 and active/standby signal 516 may be transmitted from the second output port 802 to a downstream EXB via a wired communication channel.

Furthermore, CPU RTM 518 includes a bi-directional port 804 configured to, among other things, transmit a EXB health signal 520. In one example, the bi-directional port 804 may be utilized to communicate the EXB health signal 520 to another computer (e.g., the first computer 604 shown in FIG. 6) in order to communicate a fault detected in the EXB including the CPU RTM 518. Further still, in one example, the bi-directional port 804 may facilitate communication using an Ethernet communication protocol.

Figure 9:
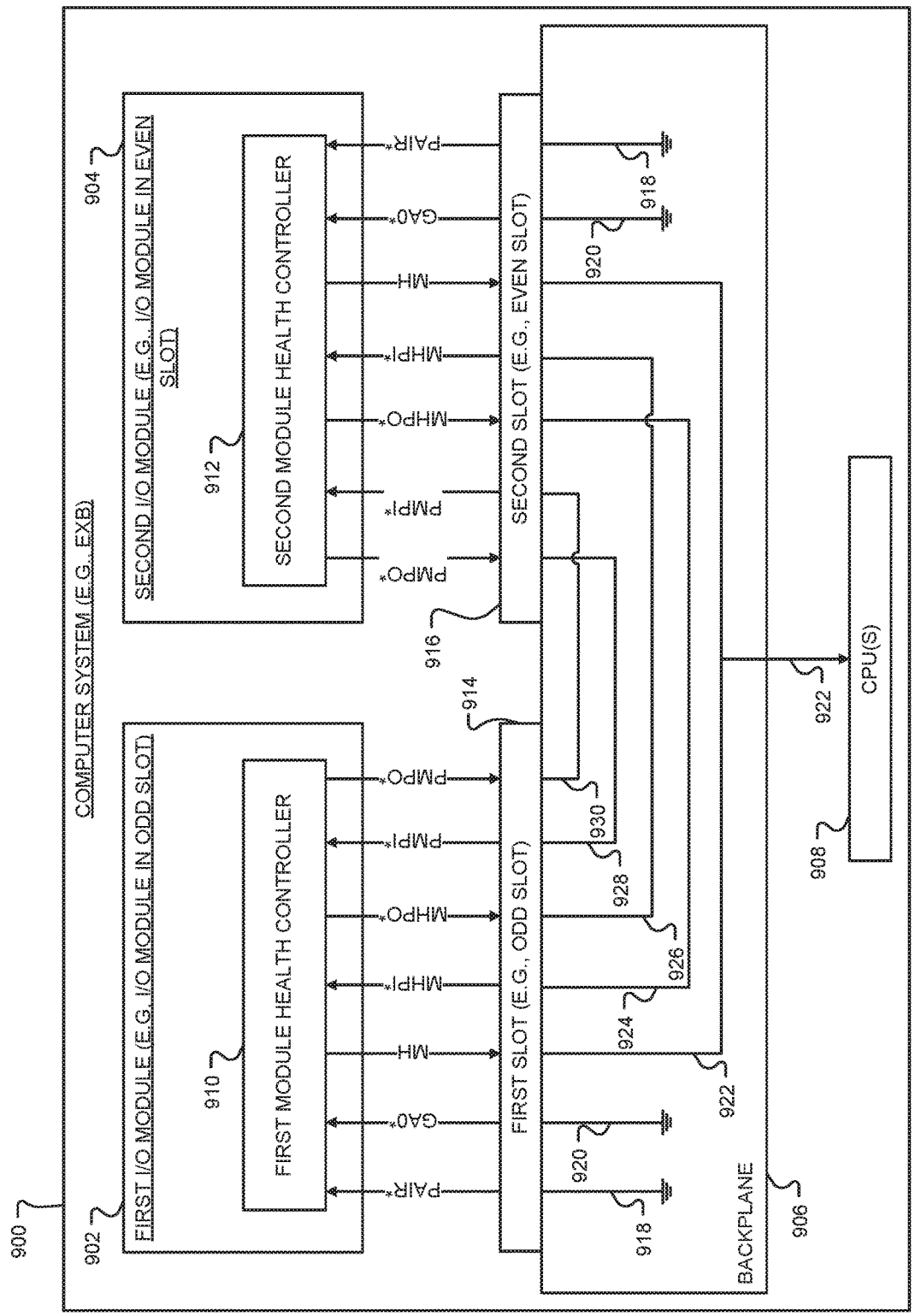
FIG. 9 is a functional block diagram of a computer system, such as an expansion box, including I/O modules configured for signal pairing according to the principles of the present disclosure.

Referring now to FIG. 9, a computer system 900, such as an expansion box (EXB), is shown. According to some examples, the system 900 may be substantially similar to the expansion box (EXB) 500 shown in FIG. 5 and may include some or all of the same components. However, for purposes of simplicity, the system 900 is only shown to include a first input/output (I/O) module 902, a second I/O module 904, a backplane 906, and one or more CPUs 908. Stated differently, other components, such as a switch module, one or more RTMs, one or more power supply units (PSUs), etc. may be included as part of the system 900 without deviating from the teachings herein.

The first I/O module 902 and second I/O module 904 shown in FIG. 9 may be substantially similar to I/O modules 128*a-f* (FIG. 1) and/or I/O modules 508-510 (FIG. 5) in terms of structure and function. However, the first I/O module 902 and the second I/O module 904 shown in FIG. 9 may include additional features and functionality beyond what is described with regard to I/O modules 128*a-f* and/or I/O modules 508-510 above.

For example, the first I/O module 902 may include a first module health controller 910. The first module health controller 910 may be operatively connected to the backplane 906 through the first slot 914. In one example, the first slot 914 may include a cPCI connector, or the like, for interfacing the backplane 906 with the first I/O module 902. In addition, the first module health controller 910 may be operatively connected to the CPU(s) 908 through the backplane 906. In this manner, the first module health controller 910 may be communicatively coupled (i.e., in bi-directional communication) with the CPU(s) 908. Furthermore, the first module health controller 910 may be operatively connected with, and communicatively coupled to, the second I/O module 904 (or, more specifically, the second module health controller 912 of the second I/O module 904) through the backplane 906.

Similarly (and as discussed briefly above), the second I/O module 904 may include a second module health controller 912. The second module health controller 912 may be operatively connected to the backplane 906 through the second slot 916. In one example, the second slot 916 may include a cPCI connector, or the like, for interfacing the backplane 906 with the second I/O module 904. In addition, the second module health controller 912 may be operatively connected to the CPU(s) 908 through the backplane 906. In this manner, the second module health controller 912 may be communicatively coupled with the CPU(s) 908. Furthermore, the second module health controller 912 may be operatively connected with, and communicatively coupled to, the first I/O module 902 (or, more specifically, the first module health controller 910 of the first I/O module 902) through the backplane 906.

According to some examples, and as discussed in additional detail below, the first slot 914 connecting the first I/O module 902 to the backplane 906 may be considered an "odd" slot (e.g., slot #1), while the second slot 916 connecting the second I/O module 904 to the backplane 906 may be considered an "even" slot (e.g., slot #2). Thus, according to some examples, the first I/O module 902 and the second I/O module 904 may connect to adjacent slots, where one slot is considered the odd slot and the other is considered the even slot, to collectively form a "slot-pair." Although the examples that follow contemplate the slot-pair constituting adjacent I/O modules, those having ordinary skill in the art will recognize that the functionality described herein could be suitably performed by a pair of I/O modules that are not directly adjacent to one another. For instance, according to some examples, the first I/O module 902 and the second I/O module 904 could be separated by one or more intervening I/O modules without deviating from the teachings herein.

In addition, although each I/O module is shown for simplicity as including only a single module health controller, according to some examples, each I/O module may include one or more additional module health controllers. For example, according to some implementations (and discussed in examples that follow), each I/O module may include two module health controllers: module health controller "A" and module health controller "B". In this implementation, each module health controller may assert a corresponding module health signal (e.g., module health signal A ("MHA") and module health signal B ("MHB")). However, again, FIG. 9 illustrates a simplified version whereby each I/O module is shown to include only a single module health controller that may assert a general module health signal ("MH").

Generally speaking, in operation, the first I/O module 902 and the second I/O module 904 may be "paired" to send a module health signal MH 922 reflecting the collective health of both the first I/O module 902 and the second I/O module 904. That is, if either the first I/O module 902 or the second I/O module 904 is unhealthy, the MH signal 922 will reflect that the pair is unhealthy. Conversely, if both the first I/O module 902 and the second I/O module 904 are healthy, the MH signal 922 will reflect that both modules 902, 904 are healthy. In a scenario in which the first I/O module 902 and the second I/O module 904 are reporting their health statuses in paired fashion, the CPU(s) 908 may be configured to place the I/O modules 902, 904 in various states based upon the nature of the reported health of the I/O modules 902, 904. These states may include an active state, a standby state, or a failsafe state. In addition, the specific MH signal 922 reflecting the health of the module pair may be sent by either the first I/O module 902, the second I/O module 904, or both I/O modules 902, 904 without deviating from the teachings herein.

Each I/O module (e.g., the first I/O module 902) is aware of the health of its mate (e.g., the second I/O module 904) by virtue of various signals shared between the modules. These signals may include the Module Health (MH) signal 922, a Module Health Pair Input (MHPI) signal 924, a Module Health Pair Output (MHPO) signal 926, a Pair Module Present Input (PMPI) signal 928, and a Pair Module Present Output (PMPO) signal 930.

The definitions and discussion that follows contemplates an architecture in which each I/O module includes two module health controllers (e.g., controller A and B as discussed above), but applies equally to the simplified architecture illustrated in FIG. 9. In an example in which each I/O module includes an "A" controller and a "B" controller, each controller may generate/receive respective "A" and "B" versions of the following signals. In addition, the following conventions apply according to some implementations of the disclosure. The notation Signal_Name* (asterisk) may be used to specify a signal that is driven low when true or asserted, and high (or float) when false or de-asserted. The notation Signal_Name (no asterisk) may be used to specify a signal that is driven high (or float) when true or asserted, and low when false or de-asserted.

MH 922 is used to collectively refer to the Module Health A (MHA) and Module Health B (MHB) signals driven by I/O modules 902, 904 to signal the CPU(s) 908 that they are healthy and ready to enter the active state or the standby state.

MHPI signal 924 is used to collectively refer to Module Health Pair Input A (MHPIA*) and Module Health Pair Input B (MHPIB*) signals. These are peer-to-peer signals monitored by the first and second I/O modules 902, 904 to determine whether their mate is ready to enter the active state or the standby state. The MHPI* signals of the second I/O module 904 are connected by the backplane 906 to the MHPO* signals of the first I/O module 902 and vice-versa.

MHPO signal 926 is used to collectively refer to Module Health Pair Output A (MHPOA*) and Module Health Pair Output B (MHPOB*) signals. These are peer-to-peer signals driven by the first and second I/O modules 902, 904 to indicate to each other that they are healthy and ready to enter the active state or the standby state. The MHPO* signals of the second I/O module 904 are connected by the backplane 906 to the MHPI* signals of the first I/O module 902 and vice-versa.

PMPI signal 928 is used to collectively refer to Pair Module Present Input A (PMPIA*) and Pair Module Present Input B (PMPIB*) signals. These are peer-to-peer signals monitored by the first and second I/O modules 902, 904 to determine whether their pair is present. The PMPI* signals of the second I/O module 904 are connected by the backplane 906 to the PMPO* signals of the first I/O module 902 and vice-versa.

Furthermore, the PAIR signal 918 and the GAO signal 920 may be used to initialize I/O modules. More specifically, the GAO signal 920 may be configured to inform a given I/O module which backplane slot it is installed in. For example, in an implementation in which modules are paired according to an "even" and "odd" configuration, the GAO signal 920 may inform a given module as to whether it is in an even or odd slot. The PAIR signal 918 may be configured to inform a given I/O module whether it is paired with another I/O module.

The following discussion reflects one example of a mode of operation of the system 900.

The Module Health signals MHA and MHB (collectively referred to as MH 922) are asserted by an I/O module (e.g., the first I/O module 902) to indicate that it is healthy and ready to enter the active state or the standby state. If either MHA or MHB are not asserted, the I/O module (e.g., the first I/O module 902) may not enter the active state or the standby state. It may enter the active state or the standby state when both of its MHA and MHB are asserted. In some example, (e.g., if an I/O module is to comply with Safety Integrity Level 4 requirements), the I/O modules may each include two redundant and separated sets of Module Health Controllers (as discussed above) to drive MHA and MHB signals.

MHA and MHB may be monitored by the CPU(s) 908, which assert the Chassis Health A (CHA) and Chassis Health B (CHB) signals when all modules installed in the system 900 and classified by application software as Safety Relevant, assert their MH signals (e.g., MH signal 922).

Figure 12:
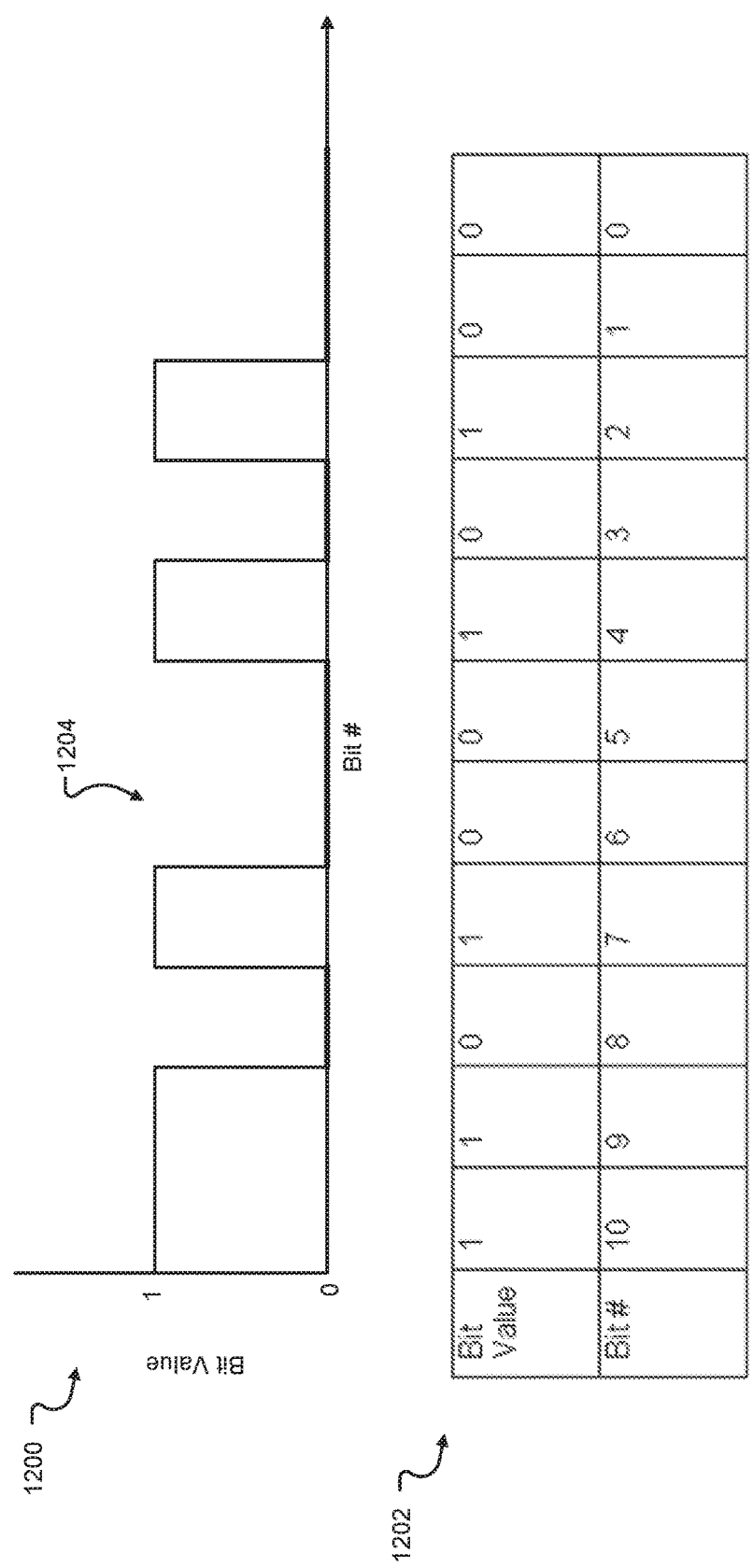
FIG. 12 is a graph and corresponding table illustrating an exemplary dynamic module health signal according to the principles of the present disclosure.

The following discussion and requirements may apply identically to both MHA and MHB. MHA and MHB may be dynamic signals (i.e., signals that carry a predefined, repeating pattern to indicate that they are asserted (true)) and may be asserted by driving a slot specific bit pattern (see, e.g., FIG. 12 showing one example of an asserted dynamic signal). MHA and MHB may be de-asserted by driving them low. When an I/O module has concluded that it is no longer healthy, it shall de-assert both MHA and MHB and enter the failsafe state. In some examples, MHA's and MHB's assertions and de-assertions shall differ from one another by no more than 200 microseconds.

Module Health (MH) 922 may be shared between each slot-pair (e.g., an odd and evens slot-pair), such that it is asserted when both I/O modules 902, 904 are healthy and are ready to enter the active state or the standby State.

When pairing, the first I/O module 902 and the second I/O module 904 may both have the same safety classification as either Safety Relevant or Interference Free (i.e., a module or function that does not impact the safety of the system), both locally and in the CPU(s) 908 chassis health registers.

As noted above, FIG. 9 illustrates one example of how the first and second I/O modules 902, 904 are interconnected to provide paired module health functionality. As noted above, the diagram only shows one of the two redundant module health controllers (e.g., first module health controller 910) and associated signals included in the I/O module (e.g., the first I/O module 902).

Referring to FIG. 9, I/O modules 902, 904 determine whether they are installed in an odd or even slot by monitoring the GAO* signal 920. In one example, the GAO* signal 920 may constitute the least significant bit of the slot geographic address associated with a given I/O module.

With continued reference to FIG. 9, I/O modules 902, 904 determine whether they are paired with another (e.g., adjacent) slot by monitoring the PAIRA* and PAIRB* signals (collectively PAIR* 918). The signal PAIR* 918 may be strapped low or floated by the backplane 906. According to some examples, I/O modules 902, 904 are configured to operate as pairs when PAIR* 918 is low, and are configured to operate independently when PAIR* 918 is high.

According to one example, I/O modules 902, 904 shall pair-up to declare they are healthy by asserting MH 922 as described in this section if PAIR* 918 is low. I/O modules 902, 904 may operate individually to declare they are healthy by asserting MH 922 when PAIR* 918 is high. If an I/O module detects that PAIRA* and PAIRB* are not both high or both low, then it may permanently drive MHA and MHB low.

In addition to driving and monitoring the shared MHA and MHB signals connected between an I/O module pair and the CPU(s) 908, each I/O module may also cross-communicate its own presence and health to its paired I/O module using a private communication channel:

Peer Module Present Output A and B (PMPOA* and PMPOB*);

Peer Module Present Input A and B (PMPIA* and PMPIB*);

Module Health Pair Output A and B (MHPOA* and MHPOB*); and

Module Health Pair Input A and B (MHPIA* and MHPIB*).

In the discussion that follows, only collective names (e.g., PMPO, PMPI, MHPO, and MHPI) are used for purposes of simplicity.

PMPO* 930 and PMPI* 928 may be cross-connected on the backplane 906 between paired slots (e.g., first slot 914 and second slot 916) to indicate I/O module presence. PMPI* 928 may be sensed low when a paired I/O module is present (and driving PMPO* 930 low).

Similarly, MHPO* 926 and MHPI* 924 may be cross-connected between paired slots on the backplane 906 to pass I/O module health status. MHPI* 924 is sensed low when a paired slot is present and driving MHPO* 926 low (healthy). MHPI* 924 is sensed high when a paired I/O module is present and driving MHPO* 926 high (unhealthy).

According to some examples, upon system 900 power up, each I/O module shall drive PMPOA* and PMPOB* low and maintain it low to indicate to its pair that it is present. According to one example, if an I/O module detects that PMPOA* and PMPOB* are not the same for more than 200 microseconds, it may drive MHA and MHB low and enter the failsafe state.

According to some examples, if an I/O module detects that PMPIA* and PMPIB* are not the same for more than 200 microseconds, it may drive MHA and MHB low and enter the failsafe state.

According to some examples, upon entering an initialize state, an I/O module may drive MHPOA* and MHPOB* high to indicate to its paired I/O module that it is unhealthy.

According to some examples, upon successfully completing initialization, an I/O module may drive MHPOA* and MHPOB* low to indicate to its paired I/O module that it is healthy.

According to some examples, if an I/O module detects that MHPOA* and MHPOB* are not the same for more than 200 microseconds, it may drive MHA and MHB low and enter the failsafe state.

According to some examples, if an I/O module detects that MHPIA* and MHPIB* are not the same for more than 200 microseconds, it may drive MHA and MHB low and enter the failsafe state.

According to some examples, local logic on an I/O module may indicate that the I/O module is ready by asserting specific bits in the module health controller. For example, in the SWM (e.g., SWM 506 of FIG. 5), the module health controller may include control bits HW which is asserted by hardware and POST and de-asserted upon a hardware or run time diagnostics failure, APP which is asserted by user application software, and WD timer which is asserted by hardware. When all are asserted the SWM is operational. De-assertion of any of these control bits may indicate that the I/O module is no longer operational. The term "Module Ready" is used to generically refer to the collection of bits in the module health controller that indicate that the I/O module is ready to enter the active state or the standby State. When this is the case, the module health controllers may assert the local signals mRA and mRB (collectively mR).

Figure 10:
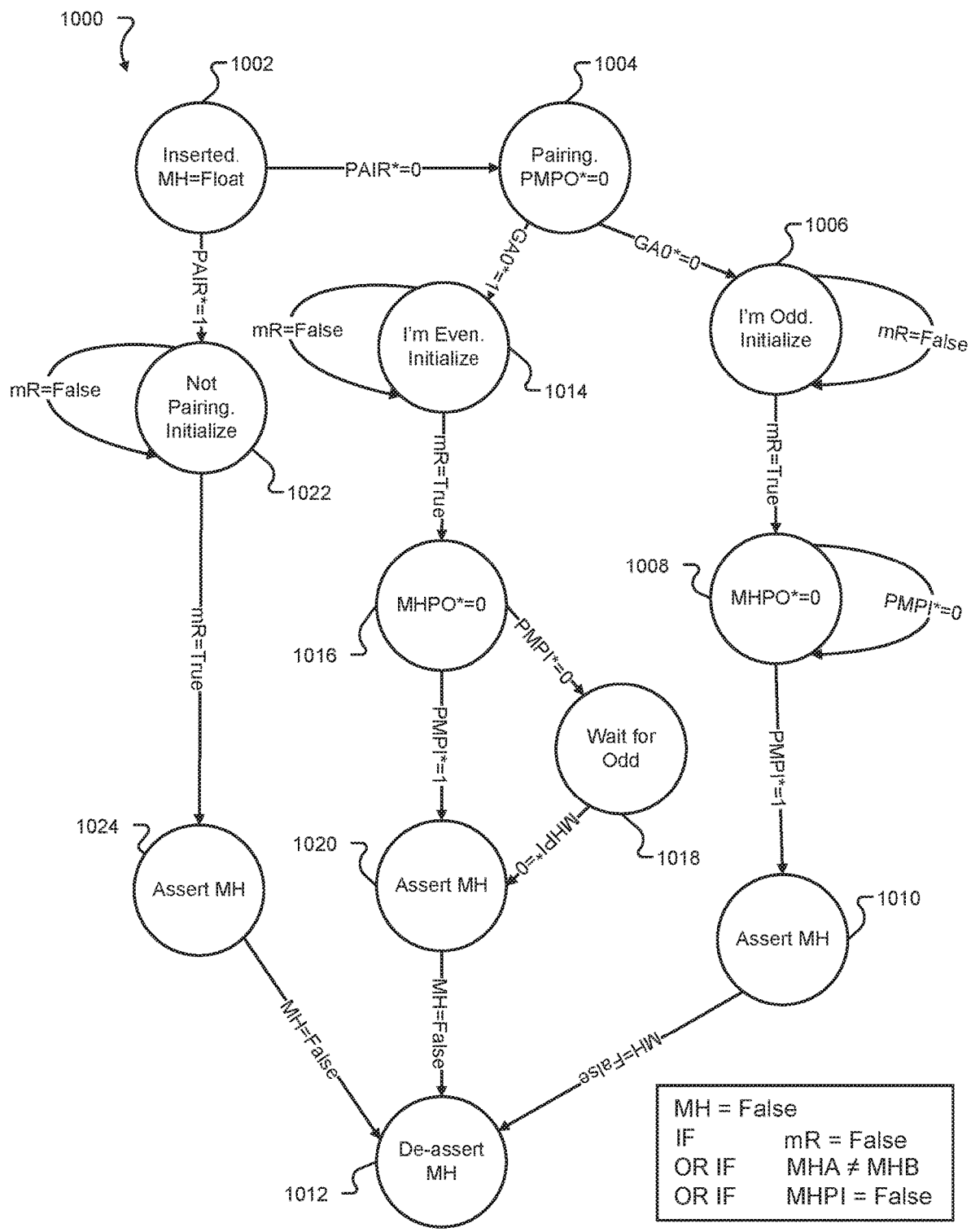
FIG. 10 is a state diagram illustrating logic for an exemplary I/O module configured for signal pairing according to the principles of the present disclosure.

Referring now to FIG. 10, an I/O module health state diagram 1000 is provided. The state diagram 1000 of FIG. 10 may be applicable to both MHA and MHB (e.g., in an implementation where each I/O module includes dual module health controllers). At 1002, an I/O module is determined to be inserted in a slot and the MH value is set to float. Upon detecting a low PAIR* signal, the flow continues to 1004 where a pairing condition is detected and the PMPO* signal is set to low.

Upon detecting a low GAO* value from 1004, the flow continues to 1006 where the I/O module detects that it is in an odd slot (odd and even being the paring conventions in this example; however, other pairing conditions could be suitably used without departing from the teachings of this disclosure) and initializes. The I/O module will remain in the state set forth at 1006 as long as mR=False. Upon detecting that mR=True, the flow continues from 1006 to 1008 where the MHPO* signal is set to low. The I/O module will remain in the state set forth at 1008 as long as the PMPI* signal remains low. Upon detection that the PMPI* signal is high, the flow continues from 1008 to 1010 where the I/O module asserts its module health (MH) signal. Upon detecting that MH=False, the flow continues from 1010 to 1012 where the I/O module de-asserts its MH signal. As noted in the key in FIG. 10, a MH=False condition will arise if (i) mR=False; (ii) MHA≠MHB; or (iii) MHPI*=False.

Upon detecting a high GAO* value from 1004, the flow continues to 1014 where the I/O module detects that it is in an even slot and initializes. The I/O module will remain in the state set forth at 1014 as long as mR=False. Upon detecting that mR=True, the flow continues from 1014 to 1016 where the MHPO* signal is set to low. Upon detecting a low PMPI* signal from 1016, the flow continues to 1018 and waits for the odd I/O module. Upon detecting a low MHPI* signal from 1018, the flow continues to 1020 where the I/O module asserts is MH signal. Returning briefly to 1016, upon detecting a high PMPI* signal, the flow continues from 1016 to 1020 where the I/O module asserts is MH signal. Upon detecting that MH=False, the flow continues from 1020 to 1012 where the I/O module de-asserts its MH signal.

Returning to 1002, upon detecting a high PAIR* signal from 1002, the flow continues to 1022 where a non-pairing condition is detected and the I/O module enters an initialization state. The I/O module will remain in the state set forth at 1022 as long as mR=False. Upon detecting that mR=True, the flow continues from 1022 to 1024 where the I/O module asserts is MH signal. Upon detecting that MH=False, the flow continues from 1024 to 1012 where the I/O module de-asserts its MH signal.

FIG. 11 is a table 1100 illustrating logic for an exemplary I/O module configured for signal pairing. More specifically, FIG. 11 specifies example conditions for an I/O module to assert or de-assert its MH signal(s) (i.e., a single MH signal in a single module health controller per I/O module architecture, and two or more signals in a multi-module health controller per I/O module architecture). The entry "X" in the table 1100 indicates that the state of the signal does not matter for this particular scenario. In addition, the value "GALSb*" set forth in the second column from the left may be described as follows. To prevent erroneous decisions, a redundant bit, RGAO*, may be introduced and combined with the GAO* signal. For the purpose of this discussion, GAO* and RGAO* are collectively referred to as GALSb*. GALSb* may be strapped low on the backplane in odd slots and floats on the backplane in even slots. (GAO* and RGAO* may be independently pulled high by the I/O module). An I/O module may operate as the Odd Module as described in this section if GALSb* is low. It may operate as the Even Module if GALSb* is high. If an I/O module detects that GAO* and RGAO* are not both high or both low, then it may permanently drive MHA and MHB low and enter the failsafe state.

The columns of the table 1100 define various signal values and/or states associated with a given I/O module. At row 1102, the I/O module is not ready to enter the active state or the standby state, so it drives MH low and drives MHPO* high. At row 1104, if PAIR* is high and the I/O module is ready to enter the active state or the standby state, it may assert MH. At row 1106, if PAIR* is low, the I/O module may drive PMPO* low to indicate that it is present (i.e., present in a slot). At row 1108, if PAIR* is low and the I/O module is ready to enter the active state or the standby state, it may drive MHPO* low, but continue to drive MH low if PMPI* is low and MHPI* is high. At row 1110, if PAIR* is low, and the I/O module is ready to enter the active state or the standby state, it may drive MHPO* low and assert MH if it detects PMPI* high. Finally, at row 1112, if PAIR* is low and PMPI* is low, and the Even I/O module is ready to enter the active state or the standby state, it may drive MHPO* low and assert MH when it detects MHPI* low.

FIG. 12 is a graph 1200 and corresponding table 1202 illustrating an exemplary dynamic module health signal 1204. The signal 1204 may represent, by way of example and not limitation, a MH signal corresponding to paired I/O modules, or a module health signal corresponding to a single I/O module. The signal 1204 is dynamic in that it constitutes a repeating, predefined bit pattern. In the example shown in graph 1200 and table 1202, the bit pattern is 11 bits defined as: 11010010100. Of course, those having ordinary skill in the art will recognize that any suitable bit pattern of any sufficient length could be utilized without deviating from the teachings of the present disclosure. In some examples, different I/O modules may drive different MH signal patterns to assert their respective module health. In some examples, paired I/O modules may drive the same bit patterns on MHA and MHB if PAIR* is low.

Figure 13:
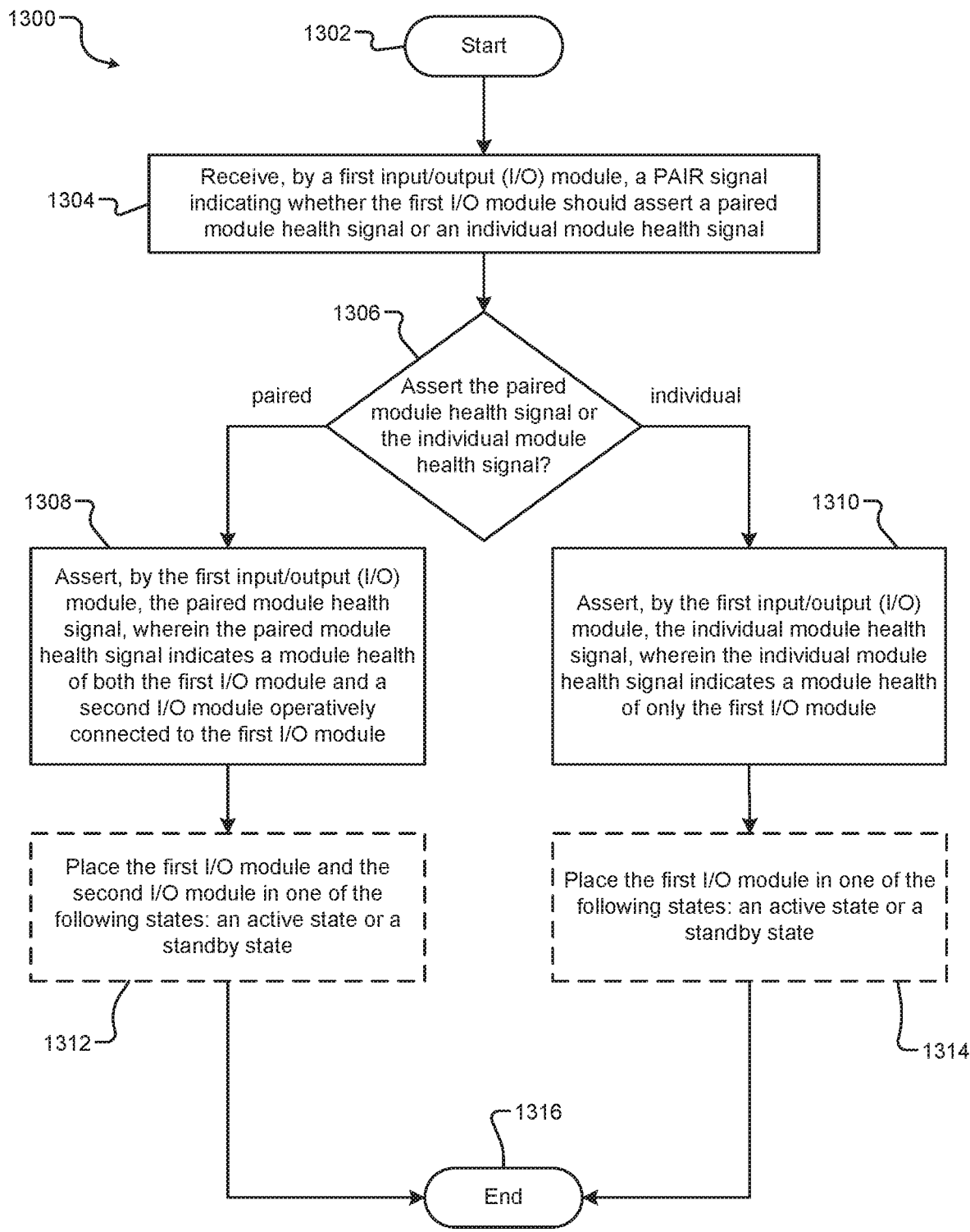
FIG. 13 is a flow diagram illustrating a method of pairing I/O module health signals according to the principles of the present disclosure.

Turning now to FIG. 13, a flow diagram illustrating a method 1300 of pairing I/O module health signals is shown. The method 1300 begins at 1302. At 1304, a first I/O module receives a PAIR signal indicating whether the first I/O module should assert a paired module health signal or an individual module health signal. At 1306, a determination is made as to whether the first I/O module should assert the paired module health signal or the individual module health signal.

If a determination is made that the first I/O module should assert the paired module health signal, the method 1300 continues to 1308 where the first I/O module asserts the paired module health signal. The paired module health signal may indicate a module health of both the first I/O module and a second I/O module operatively connected to the first I/O module. Following 1308, the method 1300 may proceed to optional step 1312 where the first I/O module and the second I/O module are placed (e.g., by the CPU(s)) in one of the following states: an active state or a standby state. Finally, following 1308 (or, optionally 1312) the method 1300 may conclude at 1316.

If, at 1306, a determination is made that the first I/O module should assert the individual module health signal, the method 1300 continues to 1310 where the first I/O module asserts the individual health module signal. The individual module health signal may indicate a module health of only the first I/O module. Following 1310, the method 1300 may proceed to optional step 1314 where the first I/O module is placed (e.g., by the CPU(s)) in one of the following states: an active state or a standby state. Finally, following 1310 (or, optionally 1314) the method 1300 may conclude at 1316.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the term module (or controller) may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a central processing unit (CPU);
a first input/output (I/O) module comprising a first module health controller operatively connected to the CPU; and
a second I/O module comprising a second module health controller operatively connected to the first module health controller and the CPU,
wherein the first module health controller and the second module health controller are configured to assert a paired module health signal to the CPU indicating that the first I/O module and the second I/O module are healthy, and
wherein the first I/O module and the second I/O module communicate at least one of a peer module present output (PMPO) signal, a peer module present input (PMPI) signal, a module health pair output (MHPO) signal, and a module health pair input (MHPI) signal therebetween.

2. The system of claim 1, wherein the asserted paired module health signal comprises a repeating, predefined bit pattern.

3. The system of claim 1, wherein the CPU is configured to place the first I/O module and the second I/O module in one of the following states upon reception of the asserted paired module health signal: an active state or a standby state.

4. The system of claim 1, wherein one of the first module health controller and the second module health controller is configured to de-assert the paired module health signal if at least one of the first I/O module and the second I/O module is unhealthy.

5. The system of claim 4, wherein the de-asserted paired module health signal comprises a low signal.

6. The system of claim 4, wherein the CPU is configured to place the first I/O module and the second I/O module in a failsafe state upon reception of the de-asserted paired module health signal.

7. The system of claim 1, further comprising:
a backplane operatively connected to the first module health controller, the second module health controller, and the CPU,
wherein the backplane is configured to transmit the at least one PMPO, PMPI, MHPO, and MHPI signals between the first module health controller and the second module health controller.

8. The system of claim 1, wherein each of the first module health controller and second module health controller is configured to receive a PAIR signal indicating whether the first I/O module and second I/O module should assert their respective health statuses individually or in paired fashion.

9. A method comprising:
receiving, by a first input/output (I/O) module, a PAIR signal indicating whether the first I/O module should assert a paired module health signal or an individual module health signal;
in response to the PAIR signal indicating that the first I/O module should assert the paired module health signal, asserting, by the first I/O module, the paired module health signal; and
in response to the PAIR signal indicating that the first I/O module should assert the individual module health signal, asserting, by the first I/O module, the individual module health signal,
wherein the paired module health signal indicates a module health of both the first I/O module and a second I/O module operatively connected to the first I/O module, and
wherein the individual module health signal indicates a module health of only the first I/O module.

10. The method of claim 9, further comprising:
in response to the first I/O module asserting the paired module health signal, placing the first I/O module and the second I/O module in one of the following states: an active state or a standby state.

11. The method of claim 9, wherein the asserted paired module healthy signal comprises a repeating, predefined bit pattern.

12. The method of claim 9, further comprising:
de-asserting, by the first I/O module, the paired module health signal in response to determining that at least one of the first I/O module and the second I/O module is unhealthy.

13. The method of claim 12, wherein the de-asserted paired module health signal comprises a low signal.

14. The method of claim 12, further comprising:
in response to the first I/O module de-asserting the paired module health signal, placing the first I/O module and the second I/O module in a failsafe state.

15. The method of claim 9, further comprising:
transmitting signals between the first I/O module and the second I/O module.

16. The method of claim 15, wherein the signals comprise at least one of:
a peer module present output (PMPO) signal;
a peer module present input (PMPI) signal;
a module health pair output (MHPO) signal; and
a module health pair input (MHPI) signal.

17. The method of claim 9, further comprising:
in response to the first I/O module asserting the individual module health signal, placing the first I/O module in one of the following states: an active state or a standby state.

18. The method of claim 17, wherein the asserted individual module health signal comprises a repeating, predefined bit pattern.

* * * * *

UNITED STATES PATENT AND TRADEMARK OFFICE
CERTIFICATE OF CORRECTION

PATENT NO. : 10,621,024 B2
APPLICATION NO. : 15/700561
DATED : April 14, 2020
INVENTOR(S) : Martin Peter John Cornes and Shlomo Pri-Tal It is certified that error appears in the above-identified patent and that said Letters Patent is hereby corrected as shown below:

In the Specification

In Column 14, at Line 59, replace "generated by the mater CPU 116a" with --generated by the master CPU 116a--

In Column 16, at Line 4, replace "the checker CPU CPU 208" with --the checker CPU 208--

In Column 16, at Line 63, replace "the active FSC 204" with --the active FSC 104--

In Column 19, at Line 38, replace "buffer 316" with --buffer 312--

In Column 19, at Line 50, replace "checker SW write buffer 316" with --checker SW write buffer 320--

In Column 19, at Line 51, replace "master HW compare buffer 320" with --master HW compare buffer 316--

In Column 20, at Line 58, replace "master HW compare buffer 324" with --master HW compare buffer 316--

In Column 24, at Line 31, replace "computer system 6238" with --computer system 628--

In Column 28, at Line 19, replace "system health signal 520" with --system health signal 514--

Signed and Sealed this
Third Day of September, 2024

Katherine Kelly Vidal
*Director of the United States Patent and Trademark Office*